US012202295B1

(12) United States Patent
Gorges et al.

(10) Patent No.: US 12,202,295 B1
(45) Date of Patent: Jan. 21, 2025

(54) OMNI-DIRECTIONAL WHEEL WITH COMPLIANT STRUCTURE FOR ROUGH TERRAIN

(71) Applicant: Amazon Technologies, Inc., Seattle, WA (US)

(72) Inventors: Jeffrey Joseph Gorges, Seattle, WA (US); Claire Gottschalk, Bellevue, WA (US); Scott Malcolm Waters, Hollis, NH (US)

(73) Assignee: Amazon Technologies, Inc., Seattle, WA (US)

( * ) Notice: Subject to any disclaimer, the term of this patent is extended or adjusted under 35 U.S.C. 154(b) by 754 days.

(21) Appl. No.: 17/208,867

(22) Filed: Mar. 22, 2021

(51) Int. Cl.
*B60B 19/00* (2006.01)
*B25J 5/00* (2006.01)
*B60B 19/12* (2006.01)

(52) U.S. Cl.
CPC ............. *B60B 19/003* (2013.01); *B25J 5/007* (2013.01); *B60B 19/12* (2013.01)

(58) Field of Classification Search
CPC ......... B60B 19/003; B60B 19/12; B25J 5/007
See application file for complete search history.

(56) References Cited

U.S. PATENT DOCUMENTS 3,219,090 A * 11/1965 Cislo ...................... B21C 47/34
152/7
4,715,460 A * 12/1987 Smith ................... B60B 19/003
180/7.1
2007/0096541 A1 * 5/2007 Guile .................. B60B 33/0028
301/5.23
2012/0185094 A1 * 7/2012 Rosenstein .......... G05D 1/0272
901/1
2015/0130260 A1 * 5/2015 Bando ................... B60B 19/003
301/5.23
2016/0375814 A1 * 12/2016 Jochim ................... B60B 19/02
414/547
2020/0094617 A1 * 3/2020 Wang ....................... B60B 9/10
2020/0147998 A1 * 5/2020 Choi ..................... B60B 19/003
2021/0114406 A1 * 4/2021 Sutherland ............. B60B 19/12

FOREIGN PATENT DOCUMENTS

CN         109367322 A   *  2/2019   ........... B60B 19/003
WO   WO-2019019362 A1   *  1/2019   ........... B60B 19/003

OTHER PUBLICATIONS

Machine Translation of CN 109367322 A, 5 pages (Year: 2019).*
Machine Translation of WO 2019019362 A1, 17 pages (Year: 2019).*

* cited by examiner

*Primary Examiner* — S. Joseph Morano
*Assistant Examiner* — Emily G. Castonguay
(74) *Attorney, Agent, or Firm* — Knobbe, Martens, Olson & Bear, LLP

(57) ABSTRACT

An apparatus includes a hub, a carrier structure and a first plurality of connective elements. The carrier structure surrounds the hub and holds a plurality of rollers that rotate within the carrier structure about an axis that is orthogonal to an axis of rotation of the hub. The first plurality of connective elements are coupled to the hub and the carrier structure. A connective element of the first plurality of connective elements elastically deforms to absorb an impact experienced by the carrier structure such that the rollers can rotate within the carrier structure while the carrier structure experiences the force.

20 Claims, 27 Drawing Sheets

US 12,202,295 B1

OMNI-DIRECTIONAL WHEEL WITH COMPLIANT STRUCTURE FOR ROUGH TERRAIN

BACKGROUND

The present invention relates to wheel structures, and more specifically, to a wheel with a compliant structure for absorbing physical impacts experienced by the wheel.

DETAILED DESCRIPTION

Robots and vehicles may move over terrain on wheels. These robots and vehicles may include suspension systems (e.g., shocks, springs, etc.) that absorb impacts experienced by the wheels. For example, the wheels of the robot or vehicle may experience impact forces (e.g., vibrations) when the robot or vehicle move over a rough surface or hit an obstacle (e.g., a curb). The suspension systems absorb these impact forces so that they do not damage other components of the robot or vehicle.

There is an increasing demand, however, for robots and vehicles to be lighter. For example, lighter robots and vehicles may be more fuel efficient and require less maintenance. Suspension systems may be heavy and contribute significant weight to a robot or vehicle. Thus, removing a suspension system from a robot or vehicle may make the robot or vehicle lighter, but the robot or vehicle may also be more prone to damage caused by impact forces.

This disclosure describes a wheel that includes a compliant structure that absorbs impact forces experienced by the wheel. Notably, the compliant structure includes connective elements that elastically deform when experiencing an impact force. The elastic deformation absorbs or disperses the impact force so that other components of the robot or vehicle are not damaged. Thus, the connective elements act as a suspension system for the robot or vehicle. In particular embodiments, a robot or vehicle that includes the wheel and its connective elements may not need to include a separate suspension system to absorb impact forces, which reduces the weight of the robot or vehicle.

In some embodiments, the wheel provides minimum static friction of at least 0.7 on dry concrete and at least 0.45 on wet concrete. Additionally, the wheel allows for at least 3.6 Newton-meters (Nm) of torque transmission for extended periods to climb slopes and at least 30 Nm for short durations to brake. In certain embodiments, the wheel reduces peak acceleration during shock events (e.g., impact forces) and dampens motion due to regular obstacles (e.g., cracks in sidewalks). The wheel may be used on robots or vehicles with a mass between 100 and 120 pounds carrying a payload of 30 pounds.

Figure 1:
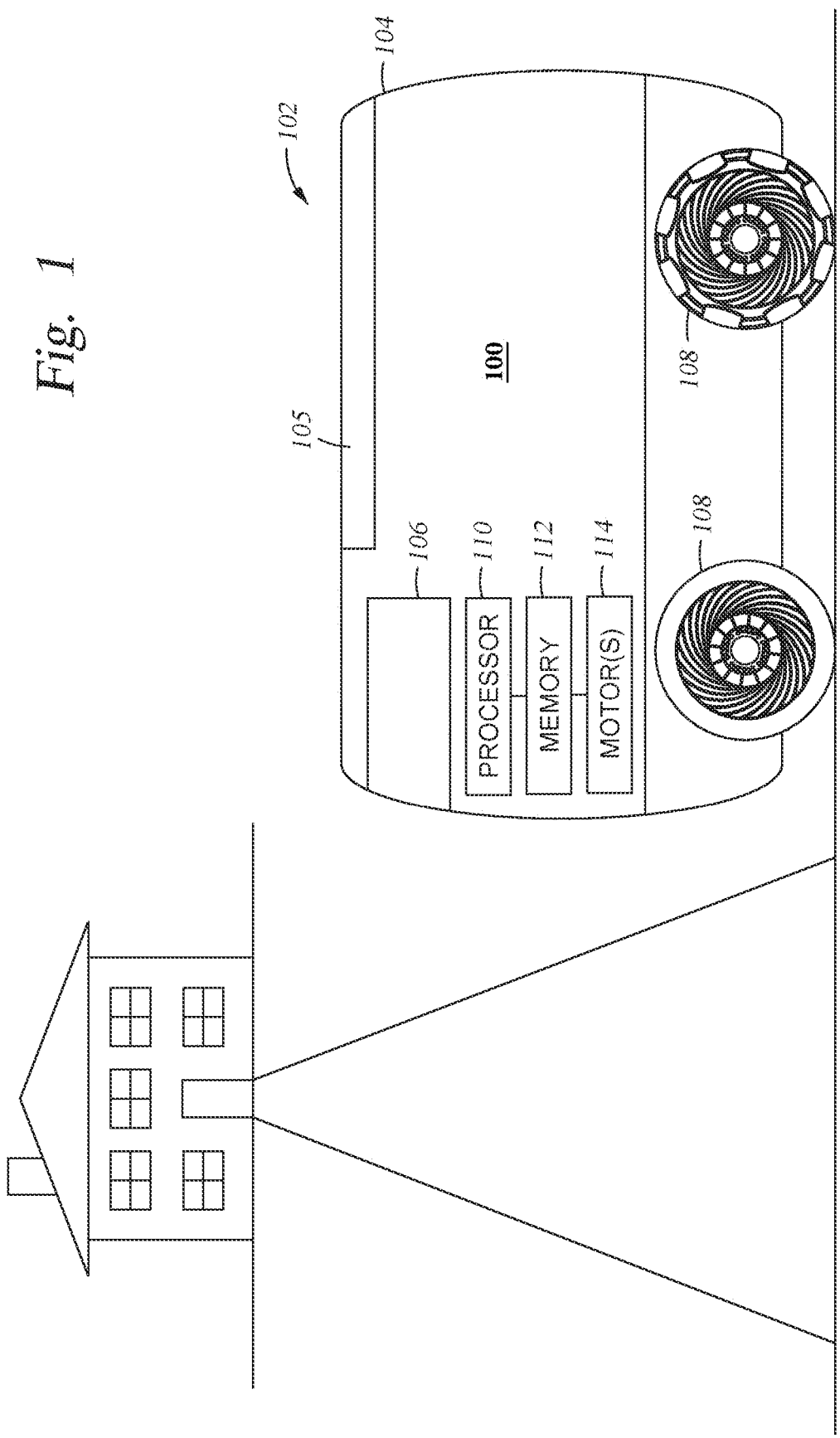
FIG. 1 illustrates an example system.

FIG. 1 illustrates an example system 100. As seen in FIG. 1, the system 100 includes a mobile robot 102, which includes a body 104, a sensor system 106, and wheels 108. These components may operate together to control the movement of the robot 102. Generally, the robot 102 may move autonomously over various terrains on wheels 108. For example, the robot 102 may be a delivery robot that delivers packages autonomously to homes or businesses. The wheels 108 of the robot 102 include compliant structures that absorb impact forces experienced by the wheels 108 or the robot 102. In particular embodiments, because the wheels 108 absorb the impact forces, the robot 102 does not need a separate suspension system to absorb the impact forces, which reduces the weight of the robot 102. As a result of its reduced weight, the robot 102 is more fuel efficient and easier to maintain.

The body 104 of the robot 102 protects the internal components of the robot 102 (e.g., a processor 110, a memory 112, one or more motors 114, and the sensor system 106). For example, the body 104 may shield these internal components from weather or debris. The body 104 may be made of any suitable material (e.g., metal or plastic). Additionally, the body 104 may include space to hold a package that the robot 102 delivers. When the robot 102 reaches its destination, a cover or lid 105 on the body 104 may open to provide access to the package. A recipient at the destination may retrieve the package from the body 104, and the robot 102 may consider the delivery to be complete. The robot 102 may then return to a central station to be loaded with another package for delivery.

The sensor system 106 includes one or more sensors (e.g., cameras, light detection and ranging sensors, infrared sensors, vision sensors, three-dimensional sensors, etc.) that detect or sense the environment around the robot 102. For example, the sensor system 106 may capture images or video of the robot's 102 surrounding environment. Other components of the sensor system 106 or other components within the body 104 may process the captured images or video to determine a position or a location of the robot 102. The captured images or video may also reveal obstacles that may impede the movement of the robot 102. The sensor system 106 or the other components within the body 104 may analyze the captured images or video to determine an optimal path that the robot 102 can take enroute to its destination. The robot 102 may then navigate itself along this path to avoid obstacles.

The processor 110 and the memory 112 are configured to control the operation of the robot 102. For example, the processor 110 and the memory 112 may control the one or more motors 114 to rotate the wheels 108 of the robot 102. The processor 110 and the memory 112 may operate the motors 114 at different speeds to navigate the robot 102. As another example, the processor 110 and the memory 112 may process information from the sensor system 106 to determine where to navigate the robot 102. As yet another example, the processor 110 and the memory 112 may determine when the robot 102 has reached its destination and open the lid 105.

The processor 110 is any electronic circuitry, including, but not limited to microprocessors, application specific integrated circuits (ASIC), application specific instruction set processor (ASIP), and/or state machines, that communicatively couples to memory 112 and controls the operation of the robot 102. For example, the processor 110 may analyze information from the sensor system 106 to navigate the robot 102 to its destination. The processor 110 may control one or more motors to rotate the wheels 108 to navigate the robot 102. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on memory to perform any of the functions described herein. The processor 110 controls the operation and administration of the robot 102 by processing information (e.g., information received from the sensor system 106 and the memory 112). The processor 110 may be a programmable logic device, a microcontroller, a microprocessor, any suitable processing device, or any suitable combination of the preceding. The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

The robot 102 may have any number of wheels 108. For example, the robot 102 may have four or six wheels 108. To move forward and backward, the robot 102 may rotate the wheels 108 on the robot 102 at the same speed. To turn the robot 102 left or right, the robot 102 may rotate the wheels 108 on one side of the robot 102 faster than the wheels 108 on the other side of the robot 102. In some embodiments, some of the wheels 108 have rollers positioned around the circumferences of the wheels 108. In the example of FIG. 1, the two back wheels 108 of the robot 102 have rollers and the two front wheels 108 do not have rollers. The rollers rotate about an axis that is orthogonal to the axis of rotation of the wheels 108, which allows for lateral movement. The rollers may be angled relative to each other (e.g., a design referred to as a mecanum wheel).

In certain embodiments, the wheels 108 on the robot 102 are not identical. For example, to improve traction and reduce uncontrolled lateral sliding, the robot 102 may have two wheels 108 with rollers that allow for lateral movement and at least two wheels 108 with standard traction elements rather than rollers.

The robot 102 includes one or more motors 114 that are coupled to the wheels 108. For example, there may be one motor 114 for each wheel 108 on the robot 102. As another example, there may be a motor 114 for each side of the robot 102. The motors 114 rotate the wheels 108 to move the robot 102.

As seen in FIG. 1, the robot 102 may move over smooth or rough terrain. For example, the robot 102 may be moving on a sidewalk that includes cracks or grooves. When the wheels 108 roll over these cracks or grooves, the robot 102 may experience an impact force. As another example, the robot 102 may be traveling towards the end of the sidewalk where there is a curb. If the robot 102 falls off the curb, the robot 102 may experience an impact force. If these impact forces are not absorbed by an on-board shock absorption system specifically adapted for that purpose, they may cause vibrations that may damage or disrupt other components of the robot 102 (e.g., the sensor system 106, internal circuitry, or other components within the body 104). In some instances, the impact force may cause vibrations that damage a package being delivered by the robot 102. The wheels 108 that have rollers may experience additional issues with respect to the impact force. For example, the rollers may be arranged around a carrier structure that surrounds a hub of the wheel. The carrier structure may be made using a rigid material that does not deflect or minimally deflects when experiencing static or dynamic loading so that the rollers can still rotate within the carrier structure. In other words, if the carrier structure were to deform, the deformation may prevent the rollers from rotating. Because the carrier structure does not deform or minimally deforms, however, no energy is dissipated and the impact force travels through the carrier structure and into other components of the wheel 108 and the robot 102, which may damage these components. Even if the robot 102 is not moving or moving at a steady state, a wheel 108 may still experience a force. For example, the weight of the robot 102 may cause the wheels 108 to experience a force. If the carrier structure does not deform or minimally deforms, however, that force travels through the carrier structure and into other components of the wheel 108 and the robot 102.

As discussed previously, the wheels 108 of the robot 102 include a compliant structure that elastically deforms to absorb impact forces experienced by the wheels 108 or the robot 102. The compliant structure may bend, move, stretch, or compress to absorb the impact force. After the impact force is absorbed, the compliant structure may return to its original shape. In particular embodiments, when the compliant structure absorbs the impact force, the compliant structure reduces or eliminates the vibrations caused by the impact force, which protects other components of the robot 102 or a package being delivered by the robot 102. Additionally, even when the robot 102 is not moving, the compliant structure elastically deforms to support the weight of the robot 102. In this manner, the robot 102 can absorb forces without using a separate suspension system. Furthermore, the carrier structures in the wheels 108 of the robot can elastically deform different amounts so that all the wheels 108 of the robot 102 contact the ground, thereby increasing the contact plane of the robot 102 (e.g., when the robot 102 is on uneven terrain). Various embodiments of the wheels 108 will be described in more detail using FIGS. 2 through 6.

Figure 2A:
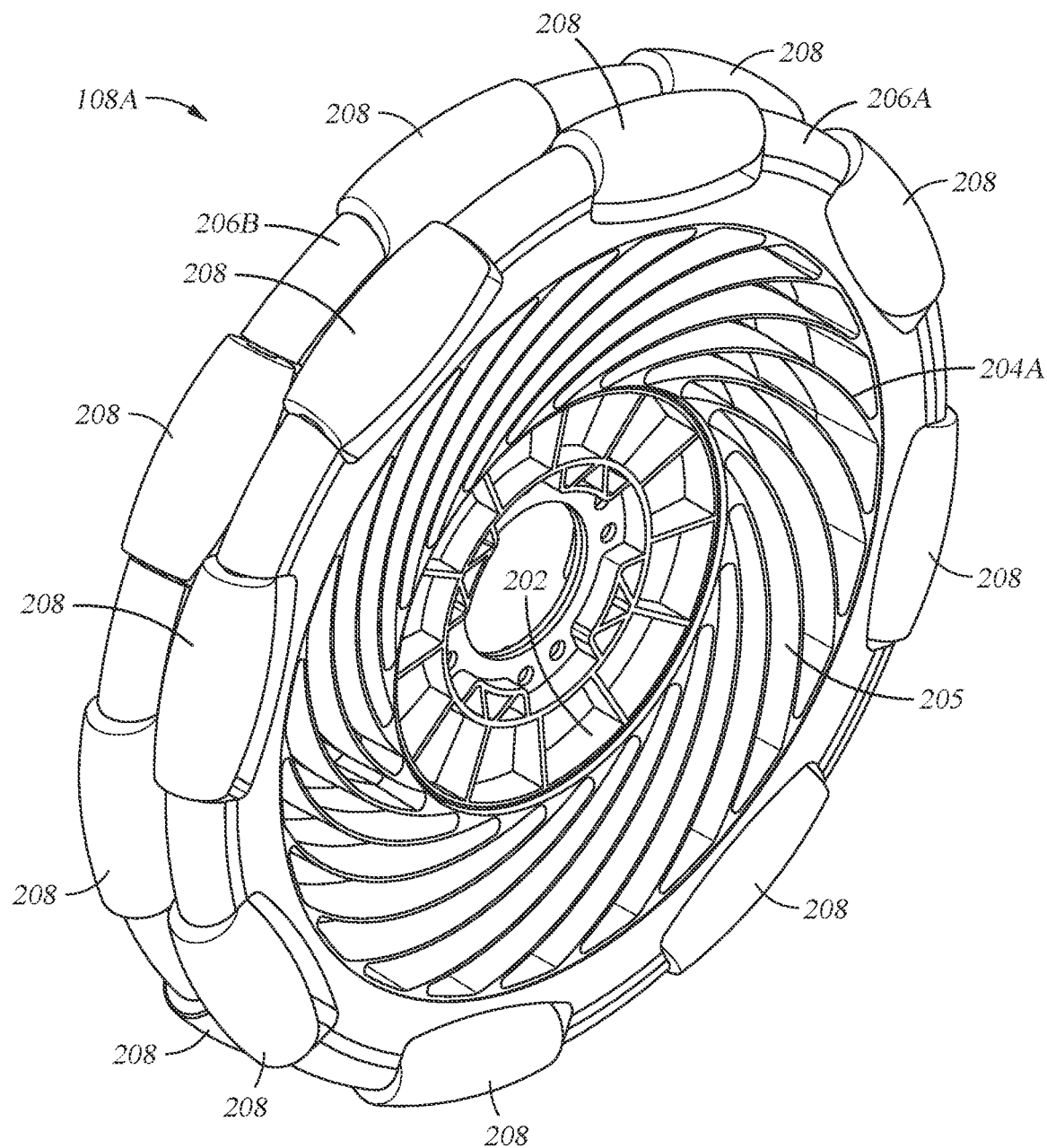
FIG. 2A illustrates an example wheel in the system of FIG. 1.

FIG. 2A illustrates an example wheel 108A in the system 100 of FIG. 1. As seen in FIG. 2A, the wheel 108A includes a hub 202, a compliant structure 204A, carrier structures 206A and 206B, and rollers 208. Generally, the compliant structure 204A elastically deforms to absorb impact forces experienced by the carrier structures 206A and 206B. In this manner, the compliant structure 204A acts as a suspension system that absorbs impact forces to protect other components. Additionally, the wheel 108A may be symmetric across a vertical plane of the wheel 108A, which allows for the same wheel 108A to be used on the right or the left side of the robot 102.

The hub 202 is positioned at the center of the wheel 108A. The hub 202 includes a central cavity that is shaped and sized to receive an axle that can turn the wheel 108A. For example, the axle may attach to a transmission system that turns the axle. When the axel e turns, the hub 202 and the wheel 108A turns with the axle. The hub 202 may be formed using a rigid material (e.g., metal) that provides structural support for the wheel 108A. The hub 202 may be circular in shape and may attach to the compliant structure 204A.

The compliant structure 204A may be a circular structure that attaches to the hub 202. The compliant structure 204A includes a central cavity in which the hub 202 fits. As seen in FIG. 2A, the compliant structure 204A includes connective elements 205 that resemble fins such that the connective elements 205 achieve a desired flexibility or deformability when the when 108A experiences a force component (e.g., a force that is directed towards the hub or tangential to the hub). For clarity, not all of the connective elements 205 of the compliant structure 204A have been labeled in FIG. 2A. The connective elements 205 couple to the hub 202 at one end and the carrier structures 206A and 206B at the other end. In certain embodiments, the connective elements 205 couple directly to the carrier structures 206A and 206B. In some embodiments, the connective elements 205 couple directly to a rim, which couples directly to the carrier structures 206A and 206B. The connective elements 205 are shaped and sized such that the connective elements 205 spiral outwards from the hub to the carrier structures 206A and 206B. The connective elements 205 may be formed using a material that elastically deforms to absorb impact forces. For example, when the wheel 108A is rolling on rough terrain, the carrier structures 206A and 206B experience impact forces that are absorbed by the connective elements 205. The connective elements 205 elastically deform to absorb the impact forces. Stated differently, the impact force causes the connective elements 205 to change their shape temporarily. As the connective elements 205 change shape (e.g., bend, move, compress, or stretch), the connective elements 205 absorb the impact force. After the impact force has been absorbed, the connective elements 205 return to their original shape. In this manner, the impact force is absorbed by the compliant structure 204A, and the full impact force does not travel through the hub 202 and into other components coupled to the wheel 108A.

The carrier structures 206A and 206B are two separate assemblies that couple to the compliant structure 204A. As seen in FIG. 2A, the carrier structures 206A and 206B are similarly-dimensioned circular structures forming a central cavity that is shaped and sized to fit the compliant structure 204A and the hub 202. The carrier structures 206A and 206B may be made of a rigid material that rotates with the hub 202. The carrier structures 206A and 206B are positioned adjacent to one another around the compliant structure 204A. In some embodiments, the carrier structures 206A and 206B have a combined width that is less than or equal to the width of the compliant structure 204A such that the carrier structures 206A and 206B do not extend beyond the hub 202 along an axis of rotation of the wheel 108A, which provides for easier rotation of the wheel 108A.

As seen in the example of FIG. 2A, the compliant structures 206A and 206B hold rollers 208. Each roller 208 rotates about an axis of rotation that is orthogonal to the axis of rotation of the wheel 108A. In this manner, the rollers 208 provide for a transverse motion of the wheel 108A. Stated differently, if the wheel 108A rotates to move forward and backward, the rollers 208 roll to move the wheel 108A in a direction lateral to the forward and backwards motion, thereby allowing for omni-directional movement of the robot 102.

As seen in FIG. 2A, both carrier structures 206A and 206B hold rollers 208. The rollers 208 are spaced around the circumference of the carrier structures 206A and 206B. The rollers 208 in the carrier structure 206A are arranged alternately with the rollers 208 in the carrier structure 206B. In other words, the rollers 208 in the carrier structures 206A and 206B are spaced such that a space between two rollers 208 on the carrier structure 206A is positioned adjacent to a roller 208 on the carrier structure 206B, and vice versa. In this manner, each point along a circumference of the compliant structure 204A is supported by at least one roller 208 on the carrier structure 206A with a carrier structure 206B.

As discussed previously, the rollers 208 provide a transverse motion for the wheel 108A. Returning to the example of FIG. 1, if the mobile robot 102 includes the wheels 108A on both sides of the mobile robot 102, the robot 102 may turn to the left or the right by rotating the wheels 108A on the left or right side of the robot 102 faster than the wheels 108A on the other side of the robot 102. When the robot 102 turns in this manner, the rollers 108 provide for a lateral movement without pulling or skidding the wheels 108A on the ground. As a result, the rollers 208 allow the robot 102 to turn while protecting the wheels 108A, increasing their lifespan. Additionally, the rollers 208 provide for reduced power consumption for turning operations, smoother or quieter motion, and more deterministic control relative to other, unpredicatble maneuvers (e.g., stick-slip of high friction maneuvers).

Figure 2B:
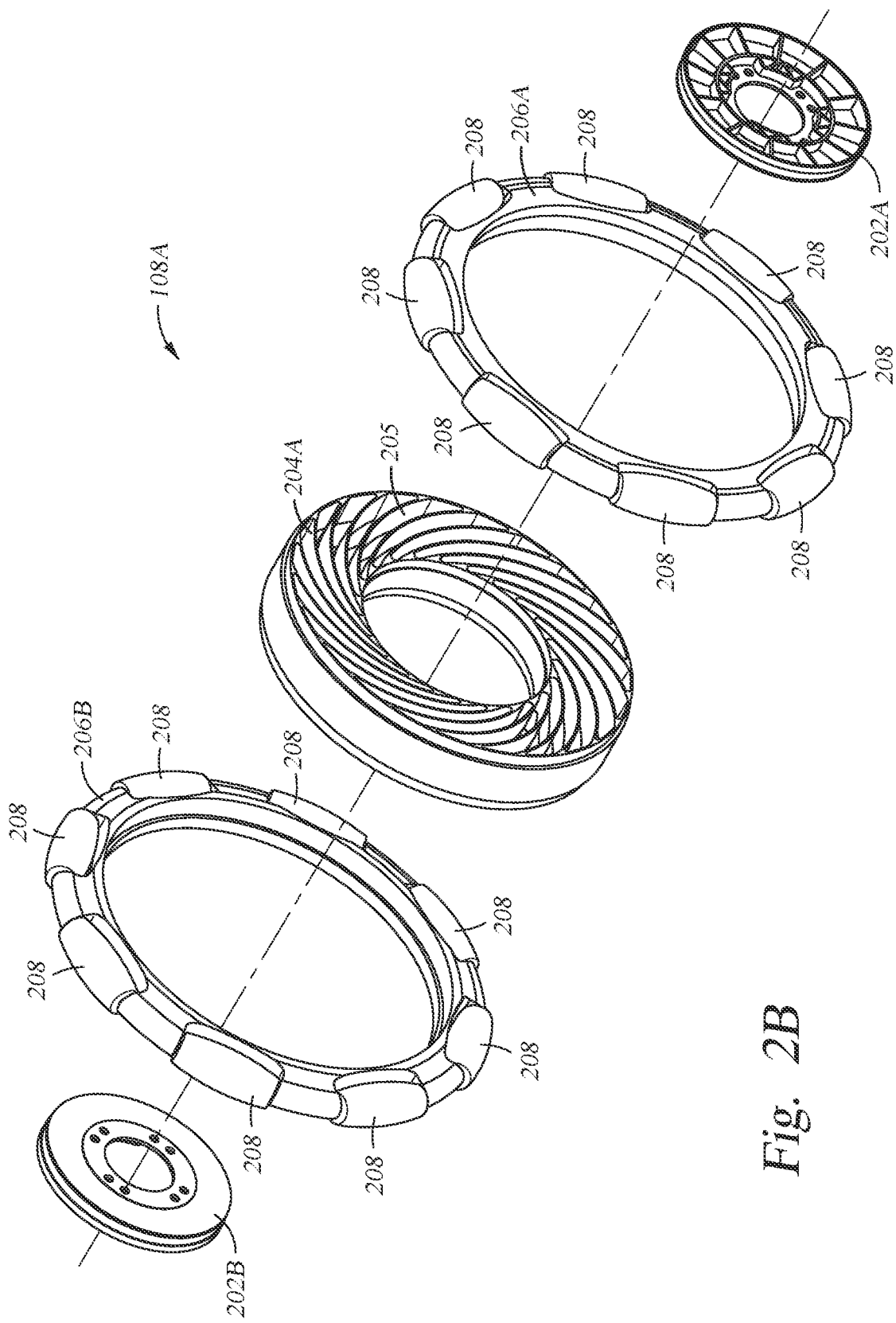
FIG. 2B illustrates an exploded view of the example wheel of FIG. 2A.

FIG. 2B illustrates an exploded view of the wheel 108A of FIG. 2A. As seen in FIG. 2B, the hub 202 is formed using two portions 202A and 202B. The portions 202A and 202B of the hub 202 may be permanently or removably coupled to each other. For example, threaded fasteners or rivets may be used to couple the portions 202A and 202B to form the hub 202. As another example, the portions 202A and 202B may be welded together to form the hub 202. The portions 202A and 202B include a central cavity that is shaped and sized to hold an axle. When the axle turns, the wheel 108 and the hub 202 turn with the axle.

The compliant structure 204A is a circular structure that includes a central cavity shaped and sized to hold the hub 202. As seen in FIG. 2B, the compliant structure 204A includes connective elements 205 that spiral outwards from the central cavity to the outer circumference of the compliant structure 204A. As discussed previously, these connective elements 205 elastically deform to absorb impact forces so that other components are not damaged by these impact forces. For clarity, not all of the connective elements 205 of the compliant structure 204A are labeled in FIG. 2B.

The carrier structures 206A and 206B include central cavities that are shaped and sized to fit the compliant structure 204A and the portions 202A and 202B of the hub 202. The carrier structure 206A is positioned adjacent to the carrier structure 206B on the compliant structure 204A. The carrier structures 206A and 206B may be coupled to the compliant structure 204A using any mechanism. For example, the carrier structures 206A and 206B may be welded to the compliant structure 204A. As another example, the carrier structures 206A and 206B may be fastened to the carrier structure 204A (e.g., using bolts or rivets).

The carrier structures 206A and 206B hold rollers 208. As discussed previously, the rollers 208 rotate about an axis that is orthogonal to the axis of rotation of the wheel 108A, thereby allowing for omni-directional movement of the robot 102. In this manner, the rollers 208 provide for lateral movement of the wheel 108A. The rollers 208 are spaced alternately around a circumference of the carrier structures 206A and 206B, such that a space between two rollers 208 on the carrier structure 206A is positioned adjacent to a roller 208 on the carrier structure 206B, and vice versa.

Figure 2C:
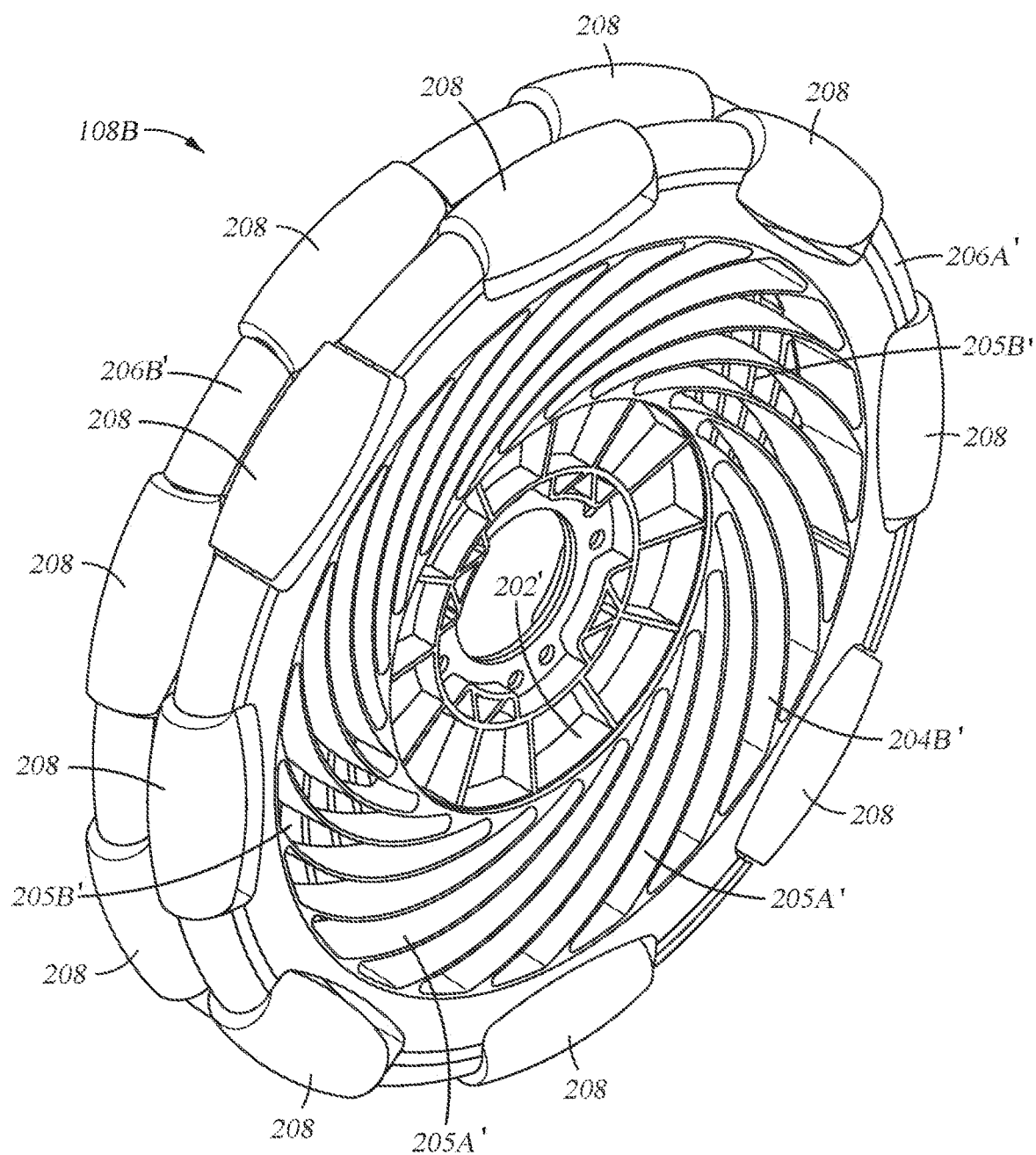
FIG. 2C illustrates an example wheel in the system of FIG. 1.

FIG. 2C illustrates an example wheel 108B in the system 100 of FIG. 1. The wheel 108B is similar to the wheel 108A of FIG. 2A except that the wheel 108B includes a compliant structure 204B' with two sets of connective elements 205A' and 205B'. These two sets of connective elements 205A' and 205B' spiral in opposite directions to balance the impact force absorption, in particular embodiments.

The wheel 108B includes a hub 202' that is structurally similar to the hub 202 of the wheel 108A. The hub 202' is positioned a center of the wheel 108B. It includes a central cavity that accommodates an axle. When the axle turns, the wheel 108B turns with the axle.

The compliant structure 204B' is positioned around the hub 202'. The compliant structure 204B' includes a central cavity shaped and sized to hold the hub 202'. As discussed previously, the compliant structure 204B' includes two sets of connective elements 205A' and 205B' that spiral outwards from the hub 202' in opposing directions. The connective elements 205A' in the foreground of FIG. 2C spiral in a counterclockwise direction. The connective elements 205B' in the background of FIG. 2C spiral in a clockwise direction. The opposing directions of the two sets of connective elements 205A' and 205B' balance the absorption of impact forces experienced by the wheel 108B, in particular embodiments. The connective elements 205A' and 205B' elastically deform (e.g., bend, move, compress, or stretch) to absorb impact forces. After an impact force is absorbed, the connective elements 205A' and 205B' return to their original shape. For clarity, not all of the connective elements 205A' and 205B' in the compliant structure 204B' have been labeled in FIG. 2C.

The wheel 108B includes the carrier structures 206A' and at 206B', which are similar to the carrier structures 206A and 206B in the example of FIG. 2A. The carrier structures 206A' and 206B' are positioned around the compliant structure 204B'. Both the carrier structures 206A' and 206B' include a central cavity that is shaped and sized to hold the compliant structure 204B' and the hub 202'. The carrier structures 206A' and 206B' hold rollers 208 that are positioned around the carrier structures 206A' and 206B'. Like the example of FIG. 2A, the rollers 208 are positioned alternately around the carrier structures 206A' and 206B'. The rollers 208 rotate about an axis of rotation that is orthogonal to the axis of rotation of the wheel 108B, which allows the wheel 108B to move laterally on the rollers 208.

Figure 2D:
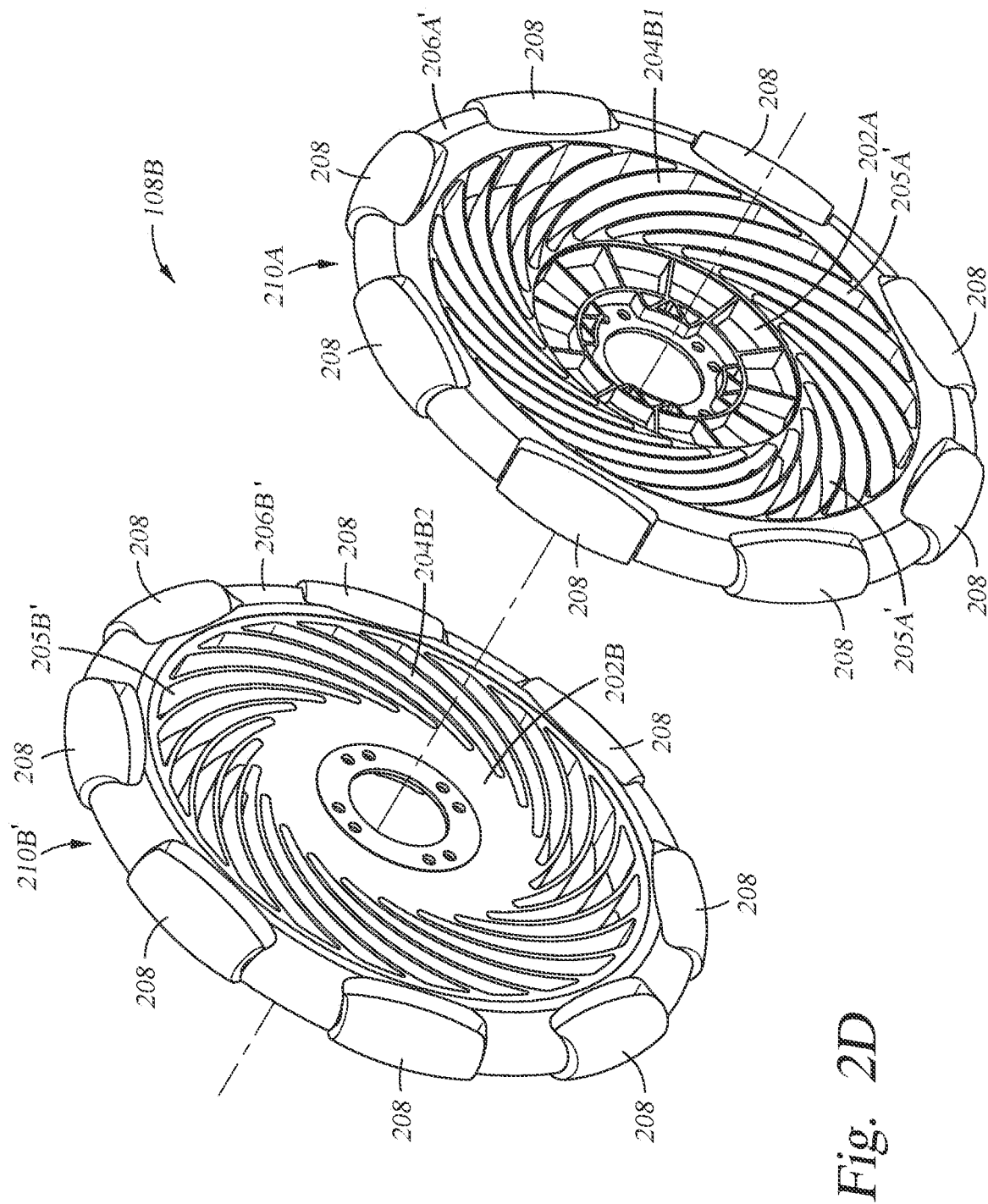
FIG. 2D illustrates an exploded view of the example wheel of FIG. 2C.

FIG. 2D illustrates an exploded view of the example wheel 108B of FIG. 2C. As seen in FIG. 2D, the wheel 108B is formed using two portions 210A and 210B. Each portion 210A and 210B is molded or formed to include a portion of the hub 202'. Each portion 210A and 210A is molded as a singular structure. The portions 210A and 210B may be coupled to each other permanently or irremovably. For example, the portions 210A and 210B may be coupled to each other using threaded fasteners or rivets. As another example, the portions 210A and 210B may be welded together.

As seen in FIG. 2D, the portion 210A includes a portion 202A of the hub 202, a portion 204B1 of the compliant structure 204B, the carrier structure 206A', and the rollers 208 in the carrier structure 206A'. The portion 210B includes a portion 202B of the hub 202', a portion 204B2 of the compliant structure 204B', the carrier structure 206B', and the rollers 208 in the carrier structure 206B'. The portions 210A and 210B are coupled together by coupling the portions 202A and 202B of the hub 202'. For example, the portion 202A and 202B may be coupled using threaded fasteners or rivets. As another example, the portions 202A and 202B may be welded together. The portions 204B1 and 204B2 of the compliant structure 204B may be formed using material that elastically deforms to absorb impact forces. The portions 202A and 202B of the hub 202' and the carrier structures 206A' and 206B' may be formed using a rigid material.

Additionally, the portion 204B1 includes the connective elements 205A' of the compliant structure 204B', and the portion 204B2 includes the connective elements 205B' of the compliant structure 204B1'. As seen in FIG. 2D, the connective elements 205A' spiral outwards in a counterclockwise direction and the connective elements 205B' spiral outwards in a clockwise direction. The connective elements 205A' and 205B' elastically deform (e.g., bend, move, compress, or stretch) to absorb impact forces. For clarity, not all connective elements 205A' and 205B' of the compliant structure 204B' have been labelled in FIG. 2D.

Figure 2E:
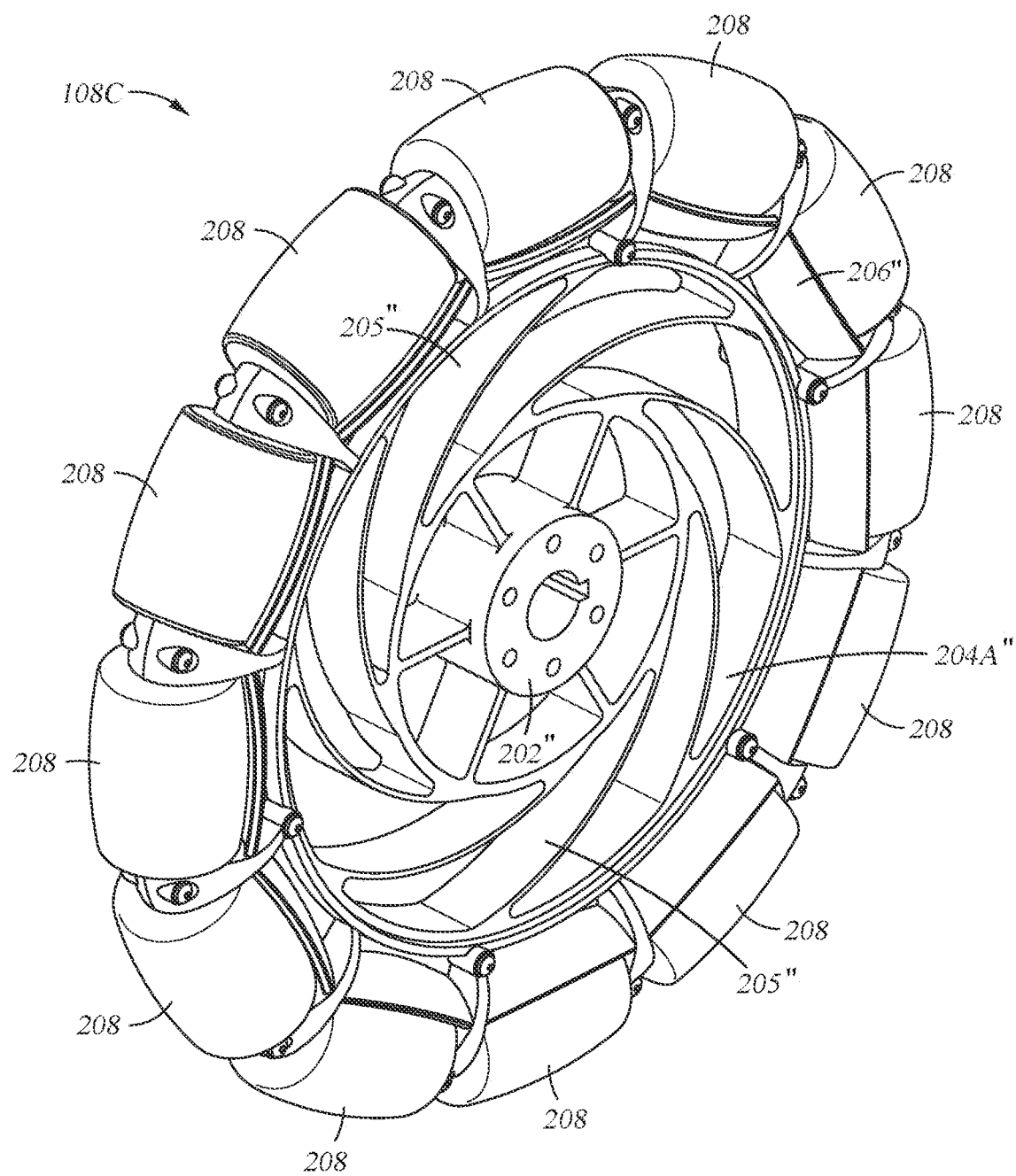
FIG. 2E illustrates an example wheel in the system of FIG. 1.

FIG. 2E illustrates an example wheel 108C in the system 100 of FIG. 1. As seen in FIG. 2E, the wheel 108C is similar to the wheel 108A of FIG. 2A, except that the wheel 108C includes only one carrier structure 206" that holds one set of rollers 208. In particular embodiments, the rollers 208 of the wheel 108C allow for lateral movement of the wheel 108C.

The wheel 108C includes a hub 202" positioned at a center of the wheel 108C. The hub 202" includes a central cavity that accommodates an axle. When the axle turns, the hub 202" and the wheel 108C turn with the axle.

The wheel 108C includes a compliant structure 204A" coupled to the hub 202" and the carrier structure 206". The compliant structure 204A" may be similar to the compliant structure 204A of the wheel 108A in FIG. 2A. The compliant structure 204A" includes connective elements 205" that spiral outwards from the hub 202". The compliant structure 204A" is formed using material that elastically deforms to absorb impact forces experienced by the carrier structure 206". The connective elements 205" of the compliant structure 204A" deform when experiencing an impact force. After the impact force is absorbed, the connective elements 205" return to their original shape. In this manner, other components, such as the hub 202", do not experience the full impact force.

The carrier structure 206" is positioned around the compliant structure 204A". The carrier structure 206" includes a central cavity that accommodates the compliant structure 204A" and the hub 202". The carrier structure 206" rotates with the hub 202" and the wheel 108C.

The carrier structure 206" holds rollers 208 that span the width of the wheel 108C. The rollers 208 rotate about an axis that is orthogonal to the axis of rotation of the wheel 108C, thereby allowing for omni-directional movement of the robot 102. As the rollers 208 rotate, they allow for the wheel 108C to move laterally. In this manner, the wheel 108C may move laterally without skidding over terrain. As a result, the rollers 208 improve the lifespan of the wheel 108C.

Figure 2F:
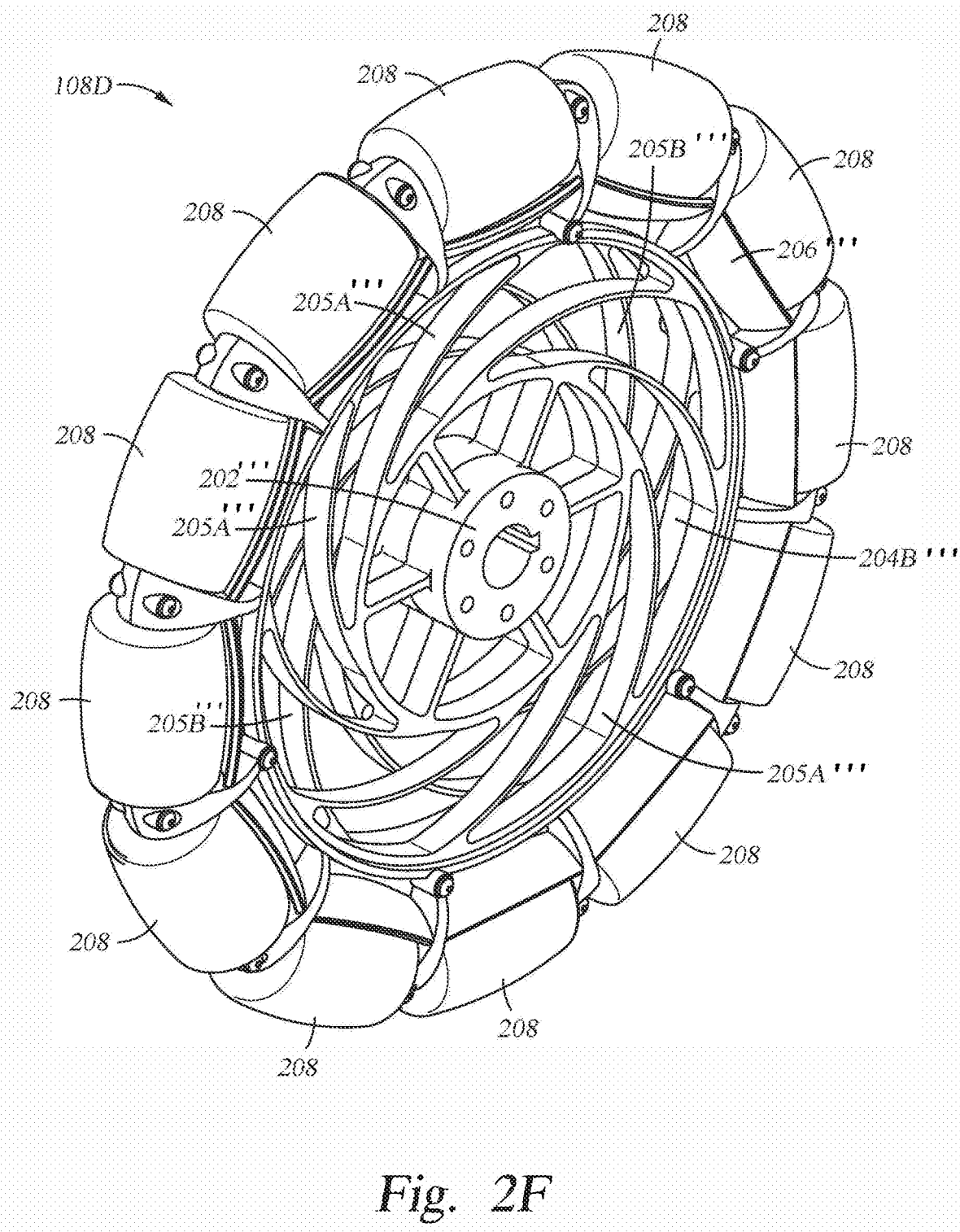
FIG. 2F illustrates an example wheel in the system of FIG. 1.

FIG. 2F illustrates an example wheel 108D in the system 100 of FIG. 1. As seen in FIG. 2F, the wheel 108D is similar to the wheel 108C, except the wheel 108D includes a compliant structure 204B''' that includes two sets of connective elements 205A''' and 205B'''. The two sets of connective elements 205A''' and 205B''' spiral outwards from the hub 202''' in opposing directions. For example, the set of connective elements 205A''' in the foreground of FIG. 2F spiral outwards from the hub 202''' in a counterclockwise direction. The set of connective elements 205B''' in the background of FIG. 2F spiral outwards from the hub 202''' in a clockwise direction. In this manner, the two sets of connective elements 205A''' and 205B''' balance the absorption of impact forces experienced by the wheel 108D. The connective elements 205A and 205B elastically deform (e.g., bend, move, compress, or stretch) to absorb impact forces. After an impact force is absorbed, the connective elements 205A''' and 205B''' return to their original shape. For clarity, not all of the connective elements 205A''' and 205B''' of the compliant structure 204B''' are labelled in FIG. 2F.

Like the wheel 108C, the wheel 108D includes a hub 202''' positioned at a center of the wheel 108D. The hub 202''' includes a central cavity that accommodates an axle. When the axle turns the hub 202''' and the wheel 108D turn with the axle.

The compliant structure 204B''' is positioned around the hub 202'''. As discussed previously, the compliant structure 204B''' includes two sets of connective elements 205A''' and 205B''' that spiral outwards from the hub 202''' in opposing directions. The connective elements 205A''' and 205B''' of the compliant structure 204B''' are formed using a material that elastically deforms to absorb impact forces. When the connective elements 205A''' and 205B''' of the compliant structure 204B''' experience an impact force, the connective elements 205A''' and 205B''' deform to absorb the impact force. After the impact force is absorbed, the connective elements 205A''' and 205B''' return to their original shape. In this manner, the compliant structure 204B''' absorbs impact forces and other components, such as the hub 202''', experience reduced impact forces, which increases the lifespan of these components, in particular embodiments.

The carrier structure 206''' is positioned around the compliant structure 204B'''. The carrier structure 206''' rotates with the hub 202''' and the wheel 108D. The carrier structure 206''' holds a set of rollers 208. The rollers 208 are positioned around the carrier structure 206'''. The rollers 208 are spaced around the carrier structure 206'''. As discussed previously, the rollers 208 allow for the wheel 108D to move laterally.

Figure 2G:
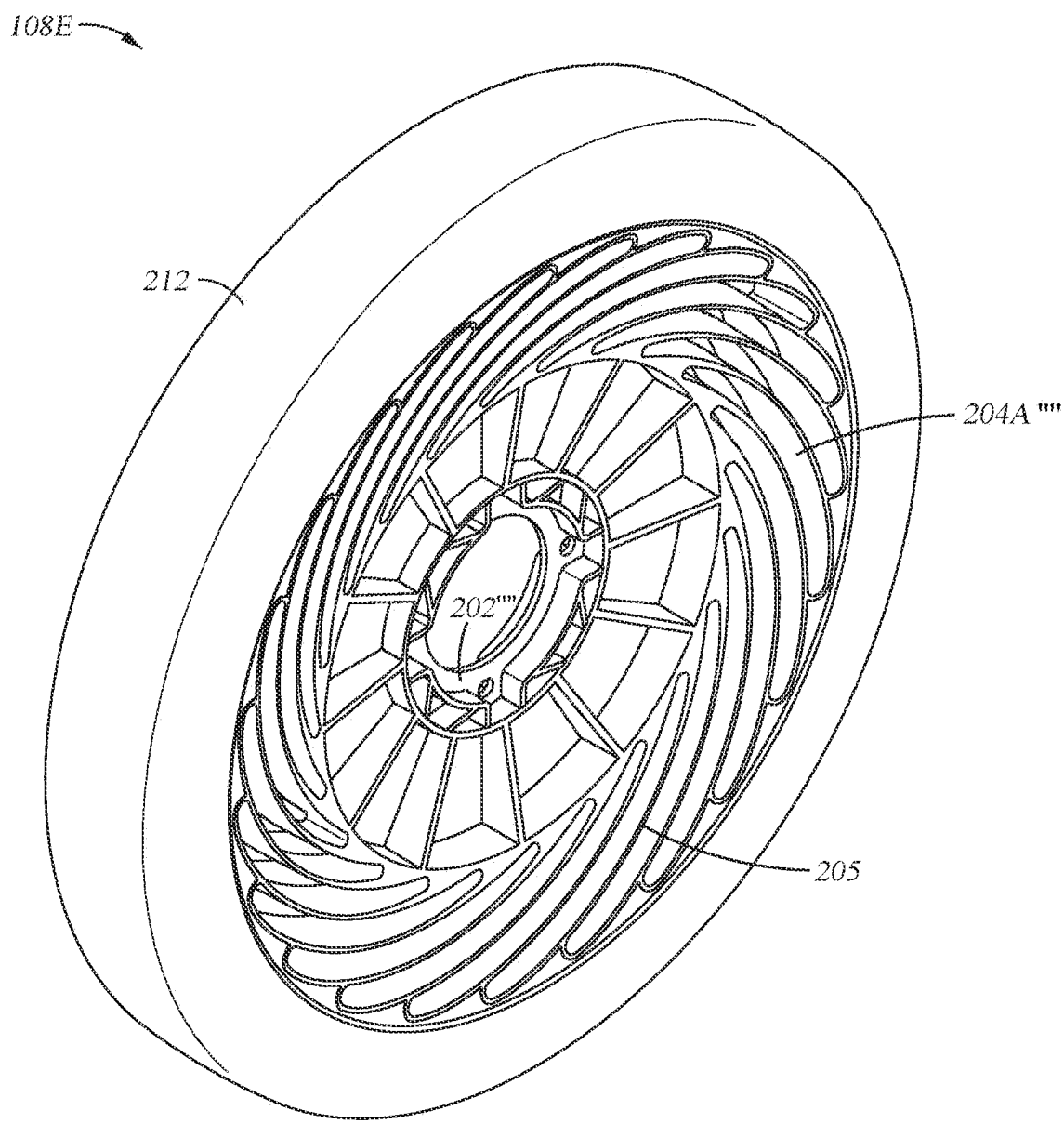
FIG. 2G illustrates an example wheel in the system of FIG. 1.

FIG. 2G illustrates an example wheel 108E in the system 100 of FIG. 1. As seen in FIG. 2G, the wheel 108E includes a hub 202'''', a compliant structure 204A'''' positioned around the hub 202'''', and a carrier structure 212 positioned around the compliant structure 204A''''. A difference between the wheel 108E and the wheel 108A of FIG. 2A is that the carrier structure 212 in the wheel 108E does not hold rollers 208. Rather, the carrier structure 212 resembles a tire that rotates with the hub 202. In certain embodiments, the carrier structure 212 includes tread that improves the traction or grip of the carrier structure 212. The robot 102 may use the wheel 108E as the front wheels.

The compliant structure 204A'''' includes connective elements 205'''' that spiral outwards from the hub 202'''' towards in the carrier structure 212 in a counterclockwise direction. For clarity, not all of the connective elements 205'''' in the compliant structure 204A'''' have been labelled in FIG. 2G. When the wheel 108E experiences an impact force, the connective elements 205 elastically deform (e.g., bend, move, compress, or stretch) to absorb the impact force. After the impact force is absorbed, the connective elements 205'''' return to their original shapes. In certain embodiments, the carrier structure 212 in the wheel 108E may be more flexible than the carrier structures 206 that hold rollers 208. As a result, the carrier structure 212 may deform more than the carrier structures that hold rollers 208.

Figure 2H:
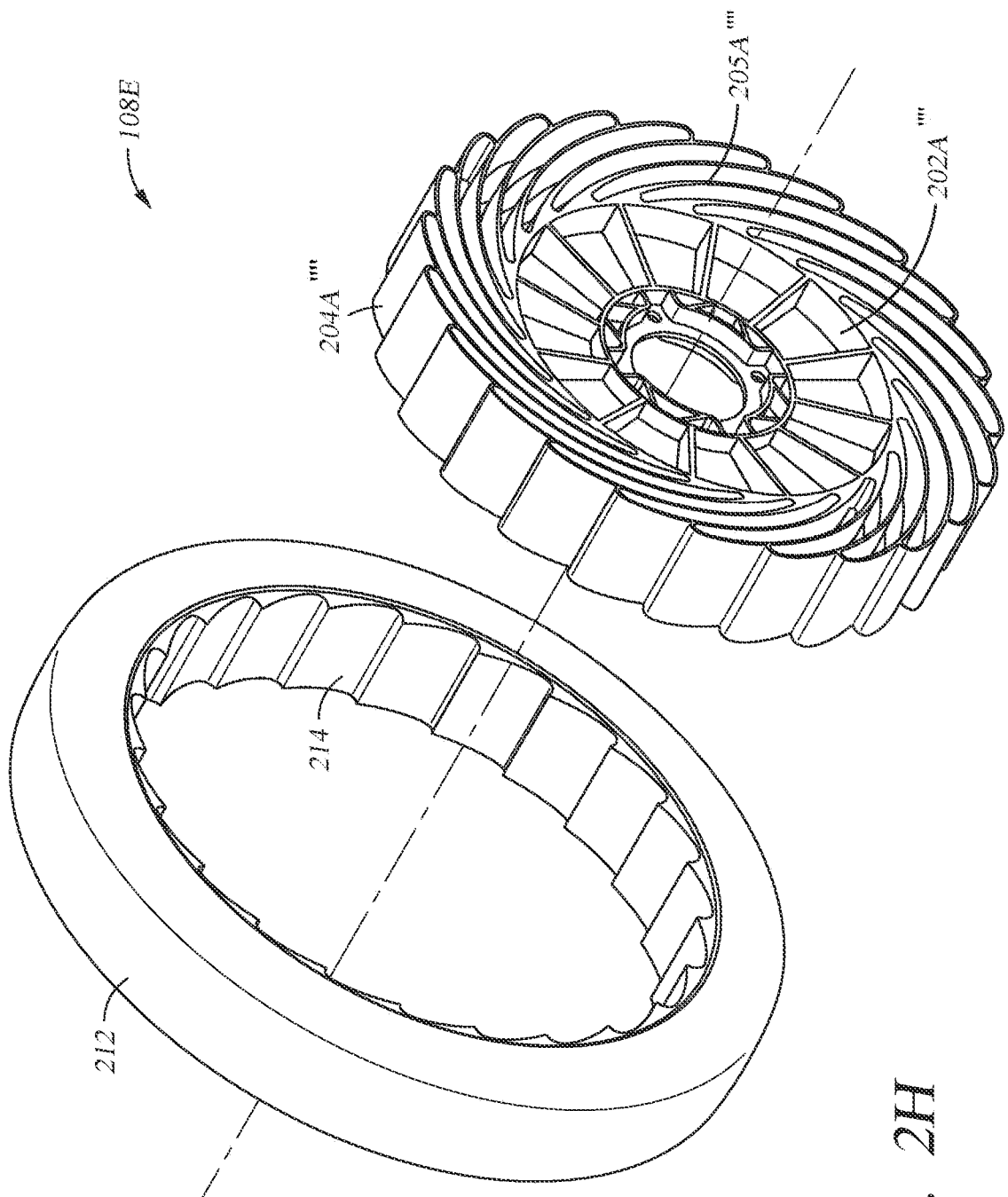
FIG. 2H illustrates an exploded view of the example wheel of FIG. 2G.

FIG. 2H illustrates an exploded view of the wheel 108E in FIG. 2G. As seen in FIG. 2H, the carrier structure 212 may include a central cavity that is shaped and sized to fit the compliant structure 204A'''' and the hub 202''''. Importantly, an outer rim of the cavity includes grooves or teeth 214 that are shaped and sized to fit around the contours of the compliant structure 204A''''. In certain embodiments, the carrier structure 212 is over-molded onto the compliant structure 204A''''. In some embodiments, the carrier structures 206A, 206B, and 206 discussed previously are over-molded onto respective compliant structures 204'''' in a similar manner.

FIGS. 3A through 3F illustrate various designs for the compliant structure 204 in the wheels 108. Although several designs are shown, this disclosure contemplates any number of designs for the compliant structure 204. Generally, each design includes connective elements that extend from the hub 202 to the carrier structure 206. Each of the connective elements are formed using a material that elastically deforms to absorb an impact force. Stated differently, the connective elements change shape when experiencing an impact force. The change in shape absorbs the impact force. After the impact force has been absorbed, the connective elements return to their original shape. In this manner, the connective elements absorb impact forces so that other components, such as the hub 202, do not experience the impact forces.

Figure 3A:
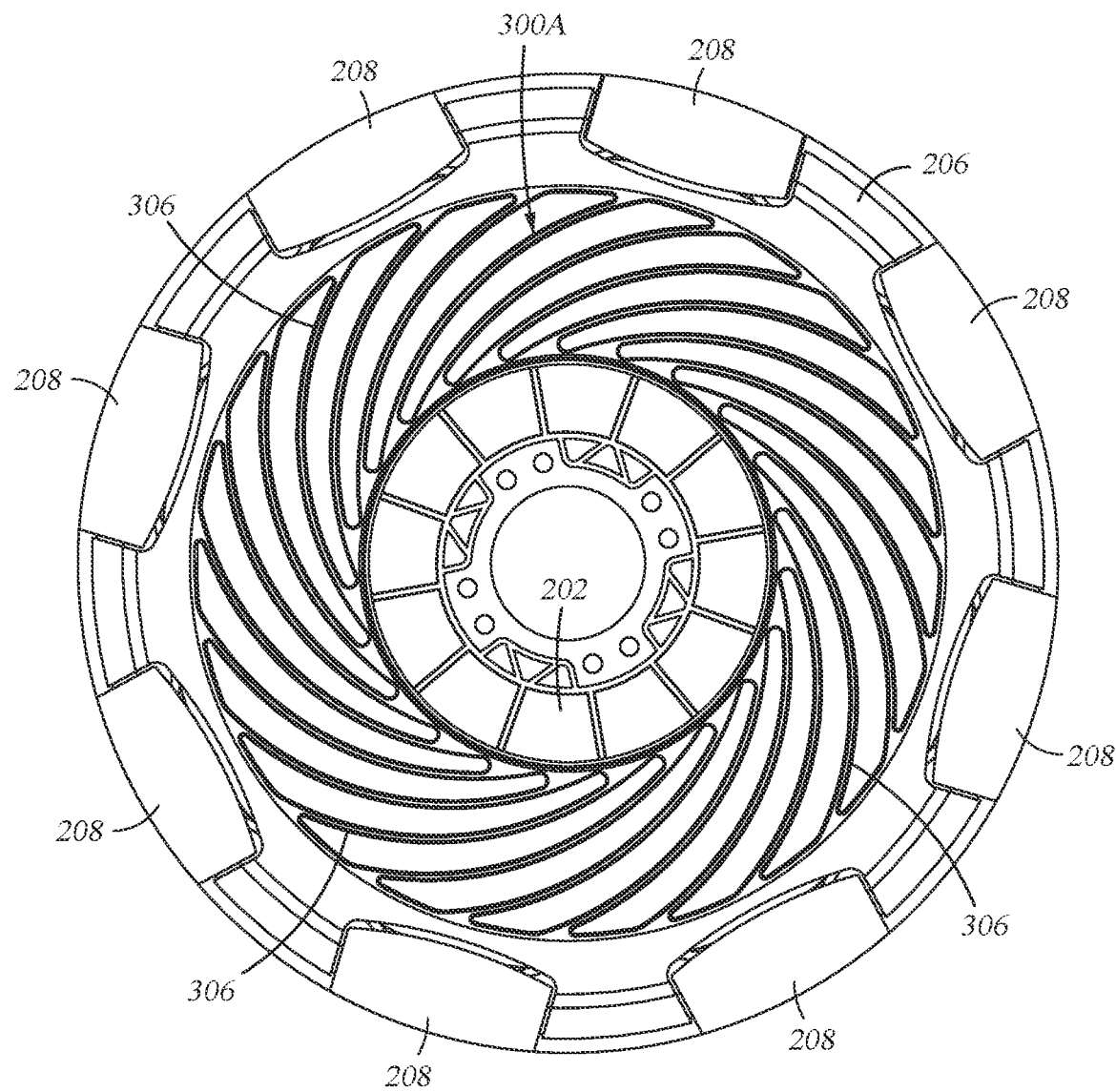
FIG. 3A illustrates an example compliant structure in the wheels of FIGS. 2A through 2F.

FIG. 3A illustrates an example compliant structure 300A in the wheels of FIGS. 2A through 2F. As see in FIG. 3A, the compliant structure 300A includes connective elements 306 that spiral out from the hub 202 to the carrier structure 206. The design of the compliant structure 300A is similar to the designs seen in FIGS. 2A through 2F. For clarity, not all of the connective elements 306 of the compliant structure 300A have been labeled in FIG. 3A.

As seen in FIG. 3A, the connective elements 306 couple to the hub 202 and the carrier structure 206. The connective elements 306 spiral out from the hub to the carrier structure 206 in a counterclockwise direction. Alternatively, as discussed previously, the connective elements 306 spiral outwards from the hub 202 to the carrier structure 206 in a clockwise direction. In the design of compliant structure 300A, the connective elements 306 have a consistent thickness along a majority of the length of the connective elements 306. As seen in FIG. 3A, the connective elements 306 share this consistent thickness along a majority of their lengths. The thickness of the connective elements 306 increases slightly near the coupling with the hub 202 or the carrier structure 206. The connective elements 306 may bend, compress, or stretch along the portion of their lengths that have the consistent thickness to absorb an impact force. After the impact force is absorbed, the connective elements 306 return to their original shape.

Figure 3B:
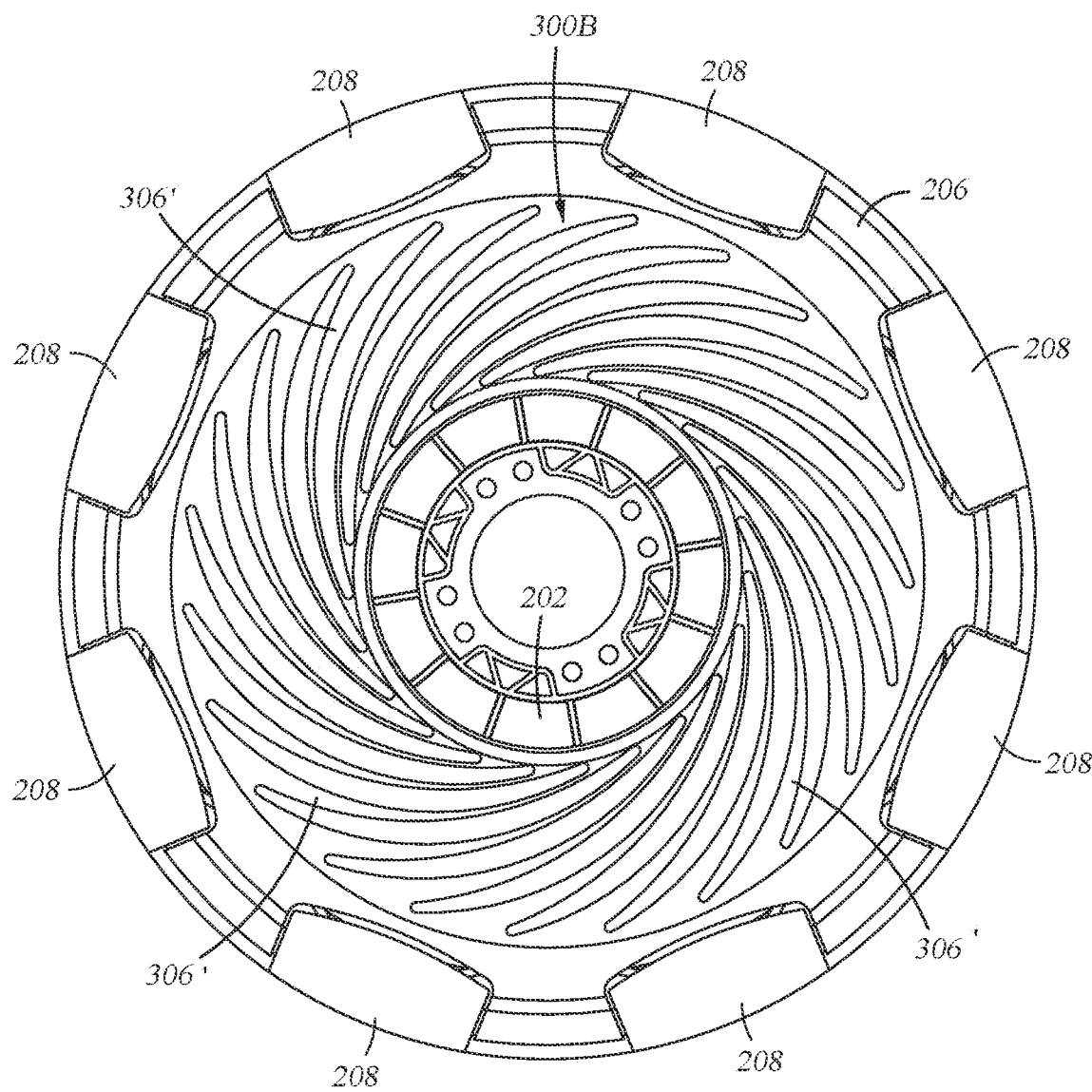
FIG. 3B illustrates an example compliant structure in the wheels of FIGS. 2A through 2F.

FIG. 3B illustrates an example compliant structure 300B in the wheels 108 of FIGS. 2A through 2F. As seen in FIG. 3B, the compliant structure 300B include connective elements 306' that are coupled to the hub 202 and the carrier structure 206. For clarity, not all of the connective elements 306' in the compliant structure 300B have been labeled in FIG. 3B. The connective elements 306' spiral outwards from the hub 202 to the carrier structure 206 in a counterclockwise direction. Alternatively, as discussed previously, the connective elements 306' spiral outwards from the hub 202 to the carrier structure 206 in a clockwise direction.

The connective elements 306' have a thickness that tapers from the carrier structure 206 to the hub 202. As seen in FIG. 3B, the connective elements 306' are thicker near the carrier structure 206 than near the hub 202. As a result, the thicknesses of the connective elements 306' changes along the length of the connective elements 306', which improves the strength of the connective elements 306' in certain embodiments. The connective elements 306' bend, compress, or stretch to absorb impact forces. After the impact forces are absorbed, the connective elements 306' return to their original shape. In this manner, the connective elements 306 absorb impact forces so that other components, such as the hub 202, do not experience those impact forces.

Figure 3C:
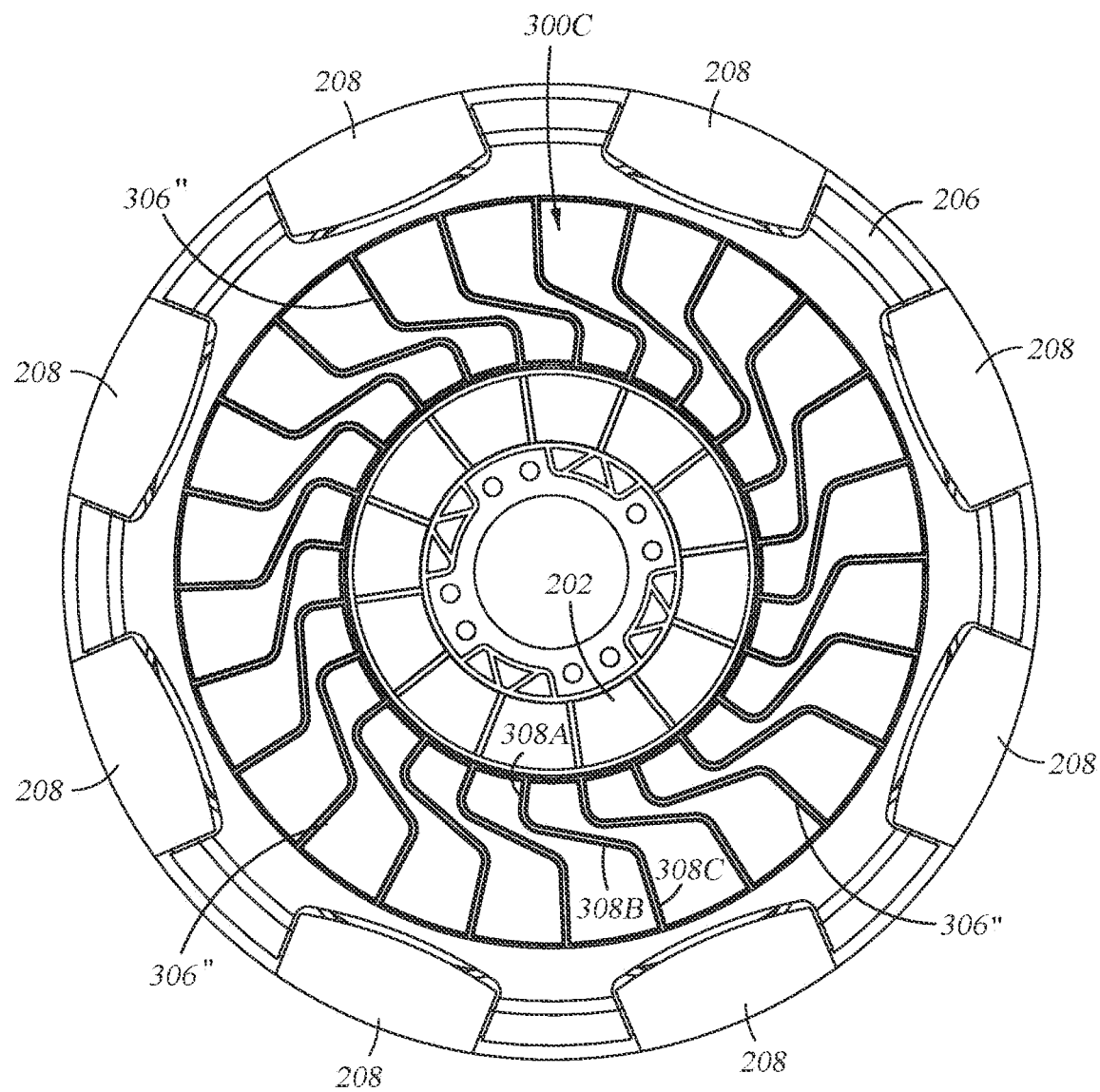
FIG. 3C illustrates an example compliant structure in the wheels of FIGS. 2A through 2F.

FIG. 3C illustrates an example of compliant structure 300C in the wheels 108 of FIGS. 2A through 2F. As seen in FIG. 3C, the compliant structure 300C includes connective elements 306" that couple to the hub 202 and the carrier structure 206. For clarity, not all of the connective elements 306" in the compliant structure 300C have been labeled in FIG. 3C. Generally, the connective elements 306" include multiple angled portions between the hub 202 and the carrier structure 206.

As seen in FIG. 3C, the connective elements 306" include three portions, 308A, 308B, and 308C between the hub 202 and the carrier structure 206. The portion 308A connects to the hub 202 and extends in a first direction towards the carrier structure 206. The portion 308B connects to the portion 308A. The portion 308B extends in a second direction from the portion 308A towards the carrier structure 206. The portion 308B extends in a direction that is different from the direction in which the portion 308A extends. The portion 308C connects to the portion 308B and the carrier structure 206. The portion 308C extends in a third direction from the portion 308B to the carrier structure 206. As seen in FIG. 3C, the portion 308C extends in a direction that is different from the directions in which the portions 308A and 308B extend. In this manner, the connective elements 306" include bends that are formed by the portions 308A, 308B, and 308C. For example, a first bend is formed using the portions 308A and 308B, and a second bend is formed using the portions 308B and 308C. Generally, the connective elements 306" may bend, stretch, or compress at these bends to absorb impact forces. After the impact forces are absorbed, these bends return to their original shapes. In this manner, the connective elements 306" absorb impact forces so that other components, such as the hub 202, do not experience those impact forces. The connective elements 306" may include any number of portions 308 and any number of bends. In certain embodiments, because the connective elements 306" are made with portions 308A, 308B, and 308C, the weight of the compliant structure 300C is reduced. Additionally, it is more difficult for debris to become stuck between the connective elements 306".

Figure 3D:
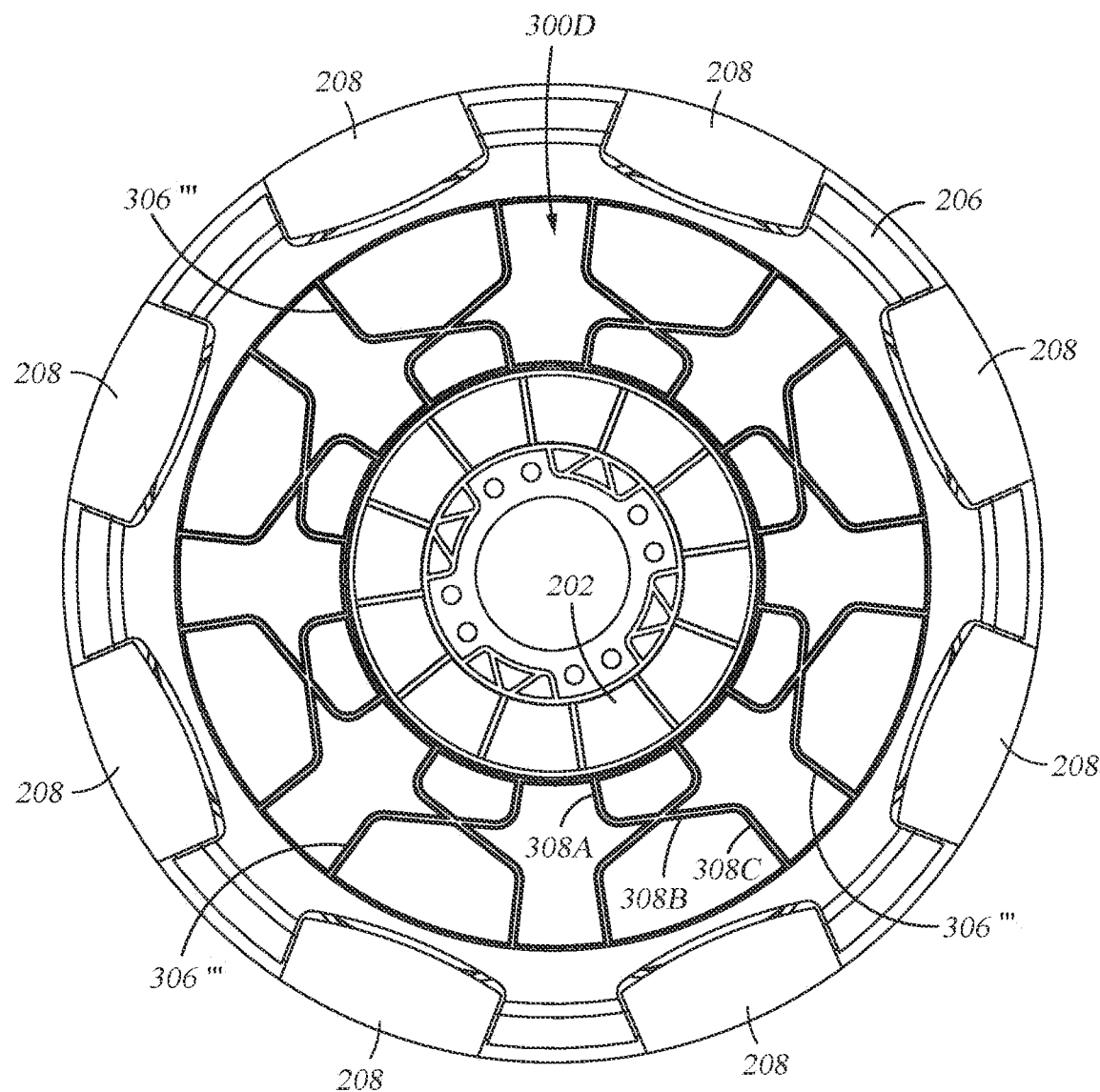
FIG. 3D illustrates an example compliant structure in the wheels of FIGS. 2A through 2F.

FIG. 3D illustrates an example compliant structure 300D in the wheels 108 of FIGS. 2A through 2F. As seen in FIG. 3D, the compliant structure 300D includes connective elements 306''' coupled to the hub 202 and the carrier structure 206. For clarity, not all of the connective elements 306''' have been labeled in FIG. 3D.

Like the compliant structure 300C in FIG. 3C, the connective elements 306''' in the compliant structure 300D include multiple portions 308 between the hub 202 and the carrier structure 206. In the example of FIG. 3D the connective elements 306''' include three portions, 308A, 308B, and 308C. The portion 308A connects to the hub 202 and extends in a first direction from the hub 202 towards the carrier structure 206. The portion 308B connects to the portion 308A and extends in a second direction from the portion 308A towards the carrier structure 206. The direction in which the portion 308B extends is different from the direction in which the portion 308A extends. The portion 308C connects to the portion 308B and the carrier structure 206. The portion 308C extends from the portion 308B towards the carrier structure 206 in a third direction. The direction in which the portion 38C extends is different from the directions in which the portions 308A and 308B extend.

As seen in FIG. 3D, the portions 308A, 308B, and 308C form bends in the connective elements 306'''. For example, a first bend is formed using portions 308A and 308B, and a second bend is formed using portions 308B and 308C. Generally, the connective elements 306''' bend, compress, or stretch at these bends to absorb impact forces. After the impact forces are absorbed, the connective elements 306''' return to their original shapes. This disclosure contemplates the connective elements 306''' including any number of portions 308 and any number of bends.

The compliant structure 300D differs from the compliant structure 300C in that the connective elements 306''' in the compliant structure 300D overlap another connective element 306''' in the compliant structure 300D. As seen in FIG. 3D, each connective element 306''' includes a portion 308B that overlaps with another portion 308B of another connective element 306''' between the hub 202 and the carrier structure 206. The connective elements 306''' may or may not couple to each other at these points of overlap. In certain embodiments, because the connective elements 306''' are made with portions 308A, 308B, and 308C, the weight of the compliant structure 300D is reduced. Additionally, it is more difficult for debris to become stuck between the connective elements 306'''. Furthermore, the symmetry of the compliant structure 300D improves the torsional load experienced by the compliant structure 300D in some embodiments.

Figure 3E:
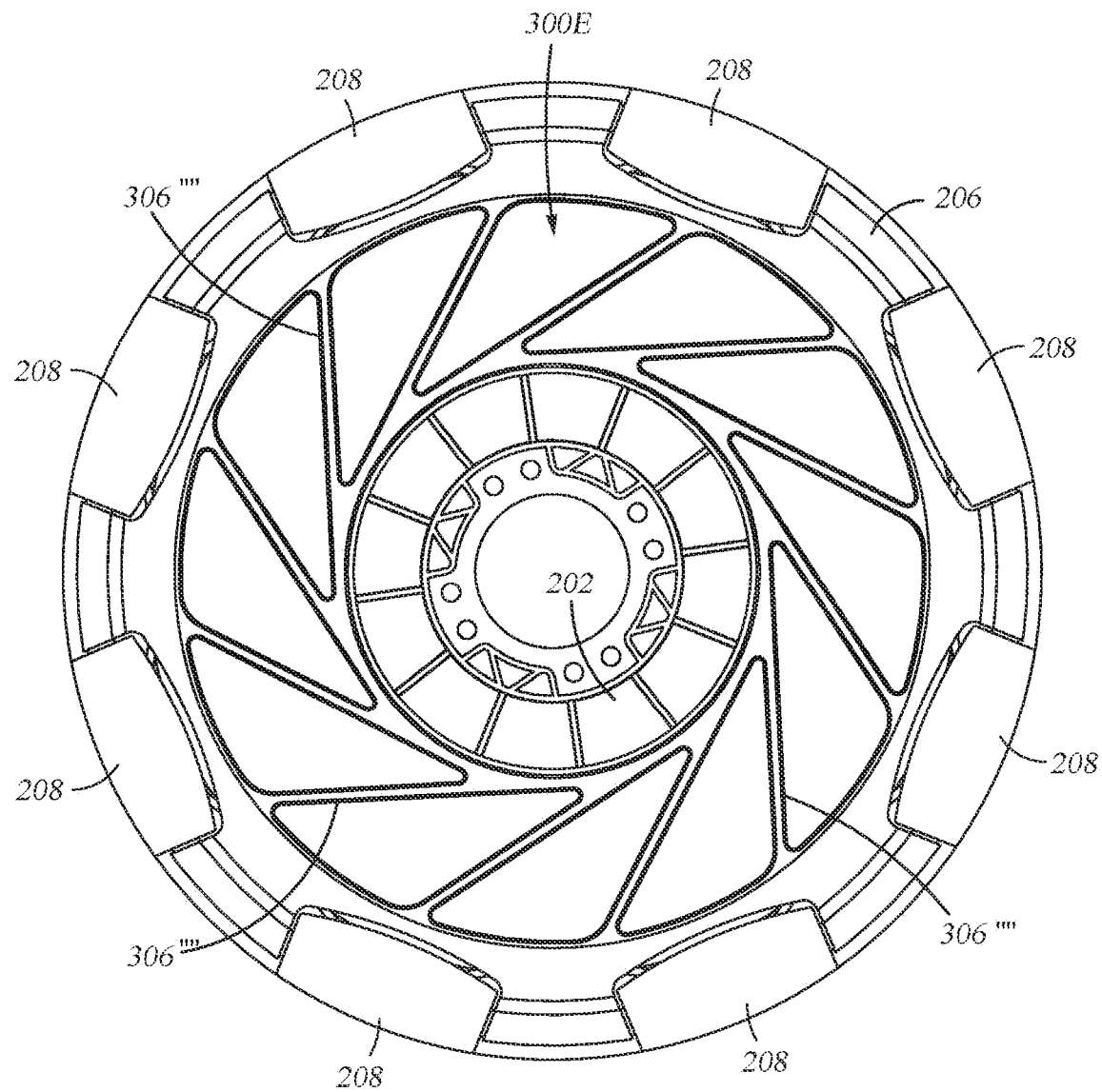
FIG. 3E illustrates an example compliant structure in the wheels of FIGS. 2A through 2F.

FIG. 3E illustrates an example compliant structure 300E in the wheels 108 of FIGS. 2A through 2F. As seen in FIG. 3E, the compliant structure 300E includes connective elements 306"" that couple to the hub 202 and the carrier structure 206. For clarity, not all of the connective elements 306"" have been labeled in FIG. 3E.

The connective elements 306"" in the compliant structure 300E are linear and coupled to the hub 202 such that the connective elements 306"" are tangential to the hub 202. The connective elements 306"" extend from the hub 202 to the carrier structure 206. As seen in FIG. 3E, each of the connective elements 306"" extend in a different direction from the hub 202. Generally, the connective elements 306"" bend, compress, or stretch along the lengths of the connective elements 306"" to absorb impact forces. After the impact forces are absorbed, the connective elements 306"" return to their original linear shape. In certain embodiments, because the connective elements 306"" are tangential to the hub 202, there is more space between the connective elements 306"" and the weight of the compliant structure 300E is reduced. Additionally, it is more difficult for debris to become stuck between the connective elements 306"".

Figure 3F:
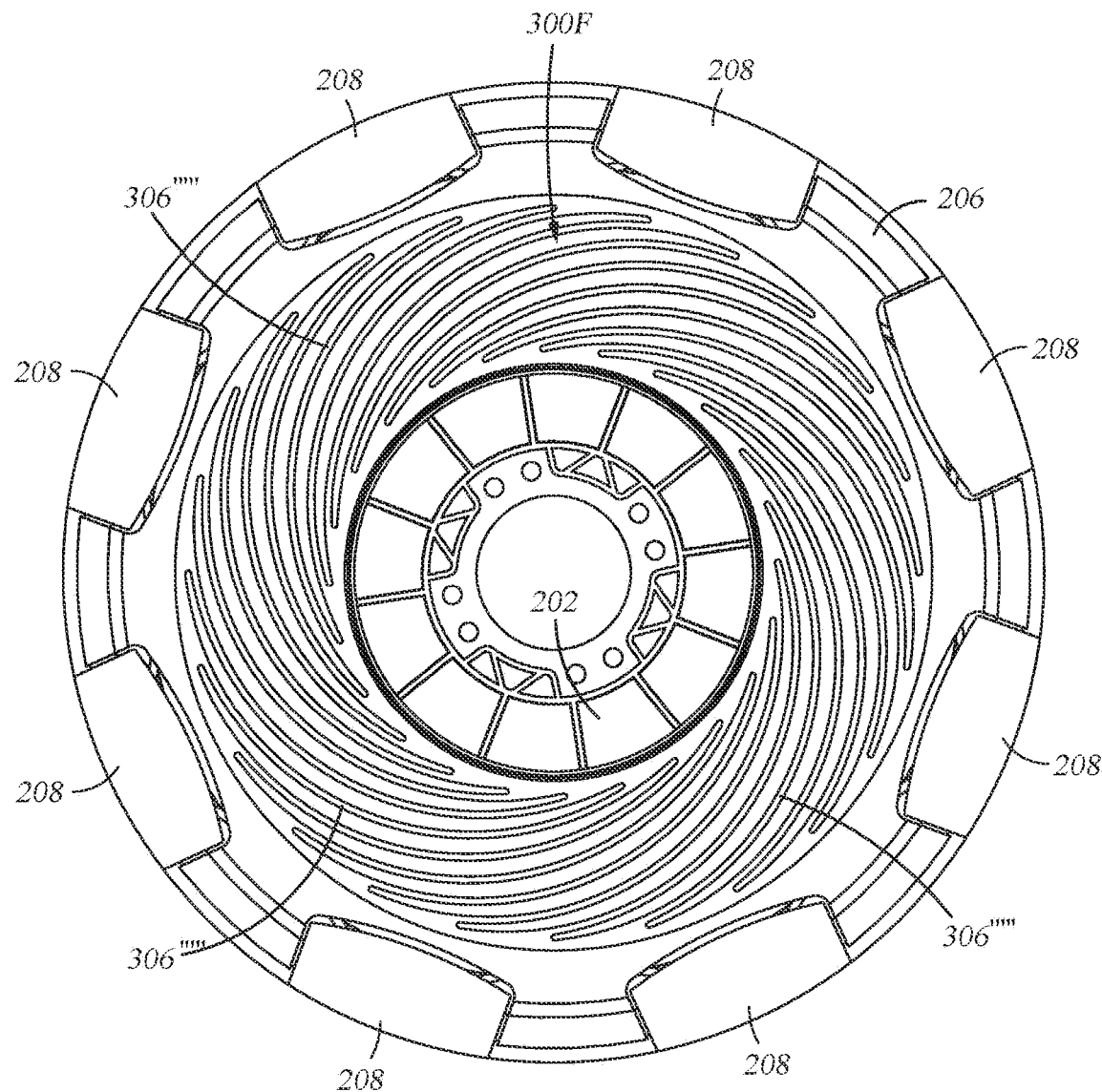
FIG. 3F illustrates an example compliant structure in the wheels of FIGS. 2A through 2F.

FIG. 3F illustrates an example compliant structure 300F in the wheels 108 of FIGS. 2A through 2F. As seen in FIG. 3F, the compliant structure 300F includes connective elements 306"" that couple to the hub 202 and the carrier structure 206. For clarity, not all of the connective elements 306"" have been labeled in FIG. 3F.

As seen in FIG. 3F, the connective elements 306"" spiral outwards from the hub 202 towards the carrier structure 206 in a counterclockwise direction. Alternatively, the connective element 306"" spiral outwards from the hub 202 towards the carrier structure 206 in a clockwise direction. The connective elements 306"" have a consistent thickness along the majority of the length of the connective elements 306"". The thickness of the connective elements 306"" increases around the coupling to the hub 202 or the carrier structure 206. The compliant structure 300F differs from the compliant structure 300A in that the compliant structure 300F has a denser arrangement of connective elements 306"". In other words, the compliant structure 300F has more connective elements 306"" than the compliant structure 300A. The connective elements 306"" may bend, stretch, or compress along the length of the connective elements 306"" to absorb impact forces. After the impact forces are absorbed, the connective elements 306"" return to their original shapes. In this manner, the connective elements 306''' absorb impact forces so that other components, such as the hub 202, do not experience these impact forces. In certain embodiments, because of the increased density of the connective elements 306"", the strength and stiffness of the compliant structure 300F is improved.

Figure 4A:
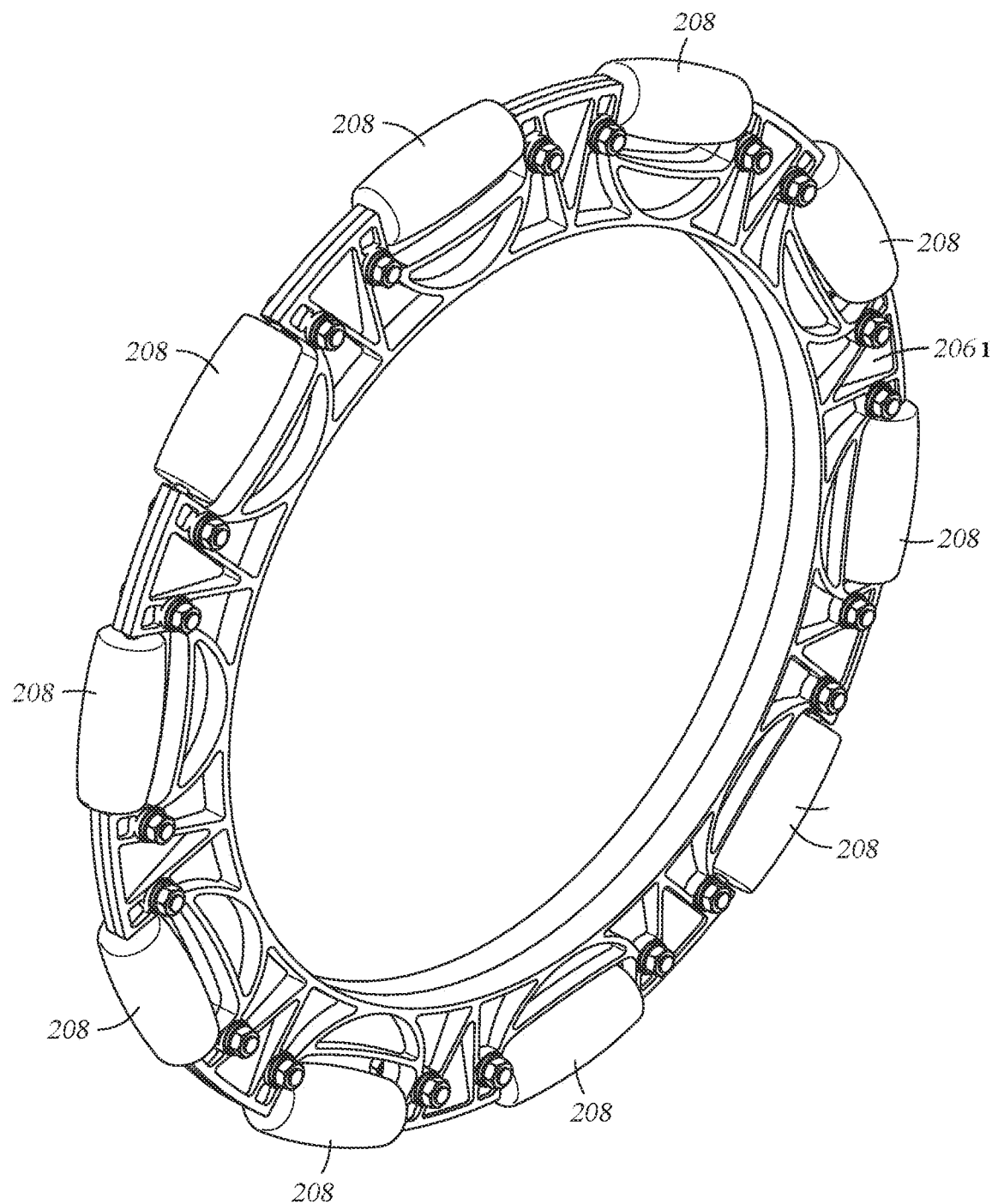
FIG. 4A illustrates an example carrier structure in the wheels of FIGS. 2A through 2D.

FIG. 4A illustrates an example carrier structure 2061 in the wheels 108 of FIGS. 2A through 2D. As seen in FIG. 4A, the carrier structure 2061 includes a central cavity that is configured to hold a compliant structure 204 and a hub 202. The carrier structure 2061 holds rollers 208 that are arranged around an outer edge of the carrier structure 2061. As discussed previously, these rollers 208 rotate about an axis orthogonal to an axis of rotation of the wheel 108, thereby allowing for omni-directional movement of the robot 102. In this manner, the rollers 208 allow the wheel 108 to move laterally on the rollers 208.

As seen previously, the carrier structure 2061 in FIG. 4A is positioned adjacent a similar carrier structure 2061 around a compliant structure 204. The rollers 208 on these carrier structures 2061 may be spaced such that the rollers 208 are arranged alternately. For example, the space between two rollers 208 in a carrier structure 2061 may be positioned adjacent to a roller 208 in the other carrier structure 2061. In this manner, every point along a circumference of a compliant structure 204 may be supported by a roller 208 of one of the two carrier structures 2061.

Figure 4B:
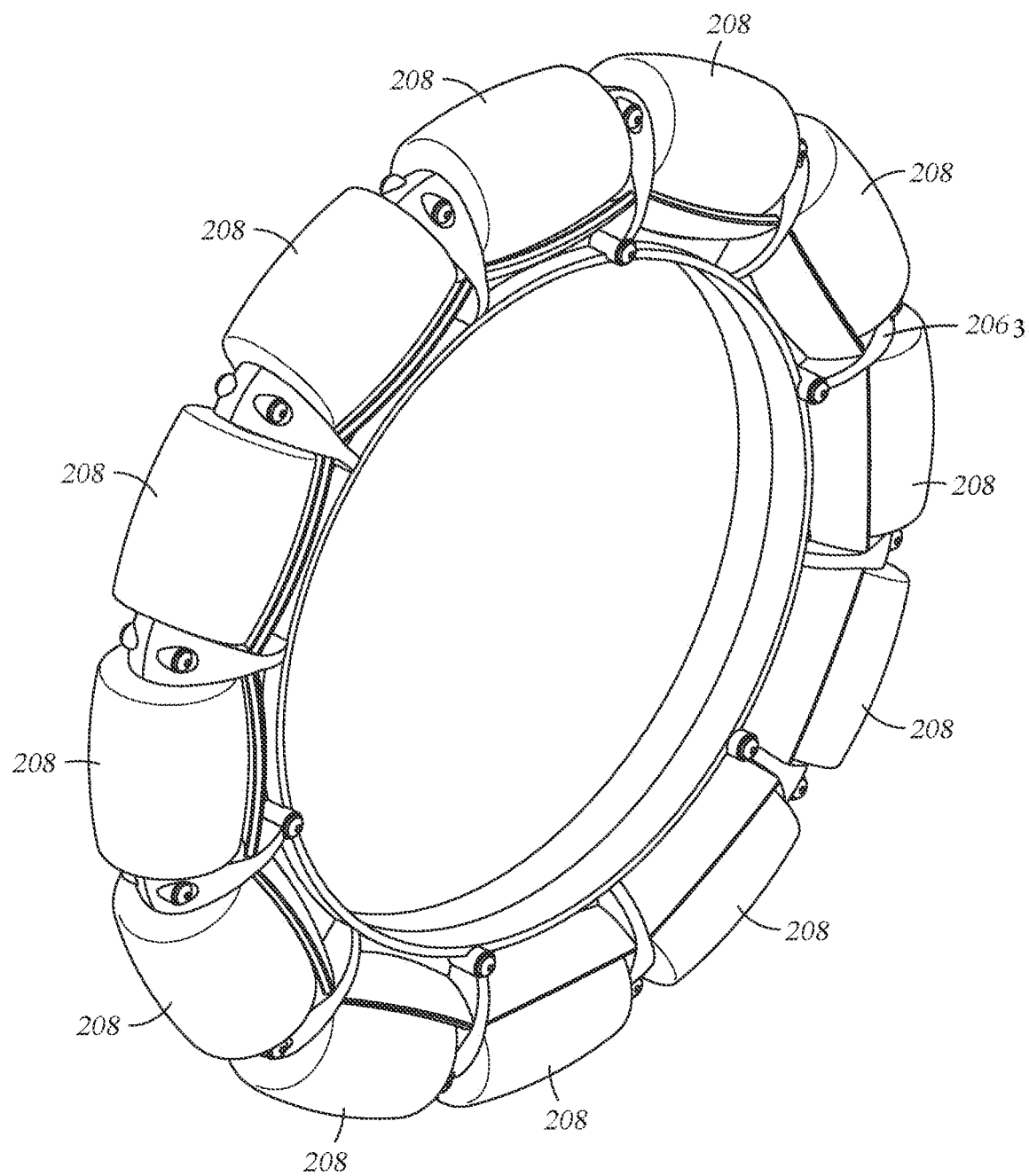
FIG. 4B illustrates an example carrier structure in the wheels of FIGS. 2E and 2F.

FIG. 4B illustrates an example carrier structure 2063 in the wheels 108 of FIGS. 2E and 2F. As seen in FIG. 4B, the carrier structure 2063 is circular and includes a central cavity that is sized and shaped and sized to hold a compliant structure 204 and a hub 202. The carrier structure 2063 holds rollers 208 that are arranged around an outer edge of the carrier structure 2063. The rollers 208 rotate about an axis orthogonal to the axis of rotation of the wheel 108, thereby allowing for omni-directional movement of the robot 102. In this manner, the rollers 108 allow the wheel 108 to move laterally on the rollers 208.

The carrier structure 2063 in the example of FIG. 4B may not be paired with another carrier structure 2063. As a result, the rollers 208 in the carrier structure 2063 of FIG. 4B are arranged closer to each other than the rollers 208 in the carrier structure 2061 of FIG. 4A. Additionally, the rollers 208 in the example of FIG. 4B are wider than the rollers 208 in the example of FIG. 4A.

Figure 5A:
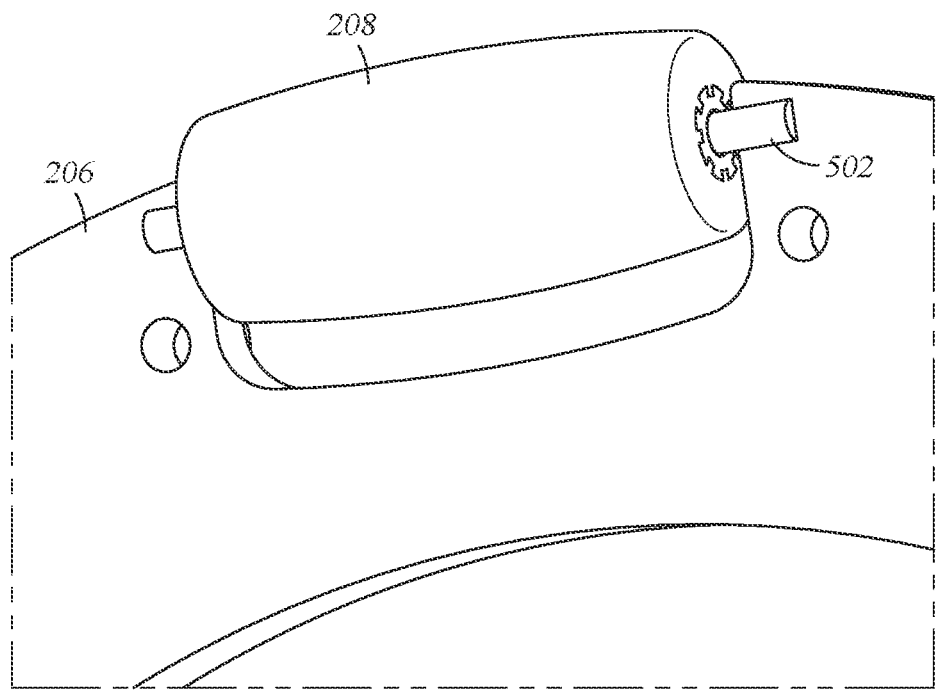
FIGS. 5A, 5B, 5C, and 5D illustrate an example roller in the carrier structure of FIG. 4A.
Figure 5B:
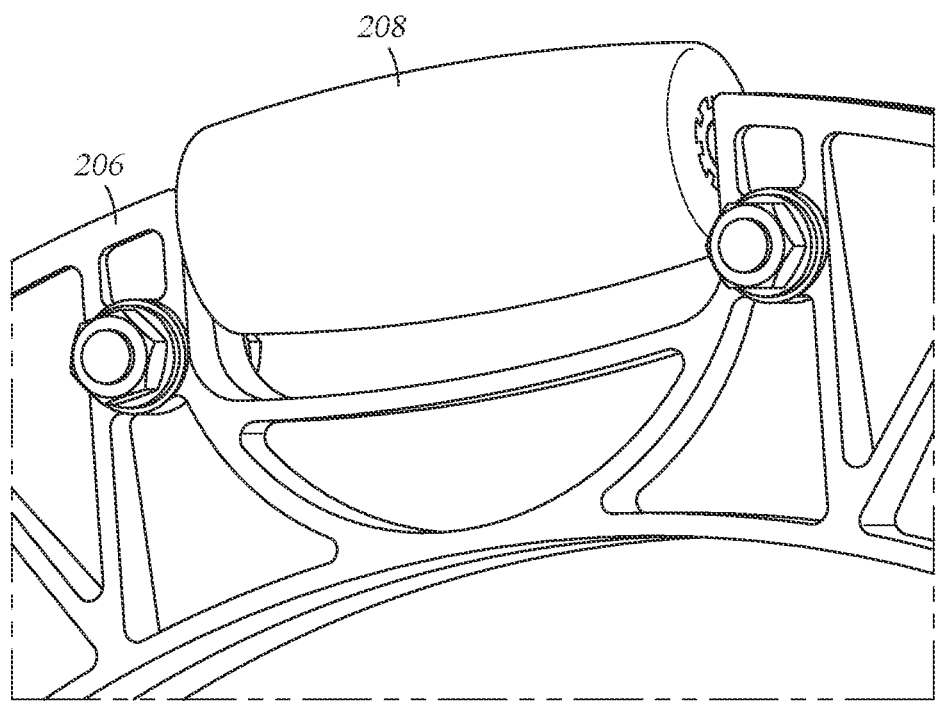

FIGS. 5A, 5B, 5C, and 5D illustrate rollers 208 in the carrier structure 206 of FIG. 4A. As seen in FIG. 5A, a rod 502 extends through a central cavity of a roller 208. The roller 208 rotates about the rod 502. The rod 502 is positioned within the carrier structure 206 so that the roller 208 rotates in the carrier structure 206. As seen in FIG. 5B, the rod 502 is secured within the carrier structure 206 by coupling two halves of the carrier structure 206 together. In this manner, the rod 502 is sandwiched between these two portions of the carrier structure 206, thus holding the rod 502 in place while allowing the roller 208 to rotate on the rod 502.

Figure 5C:
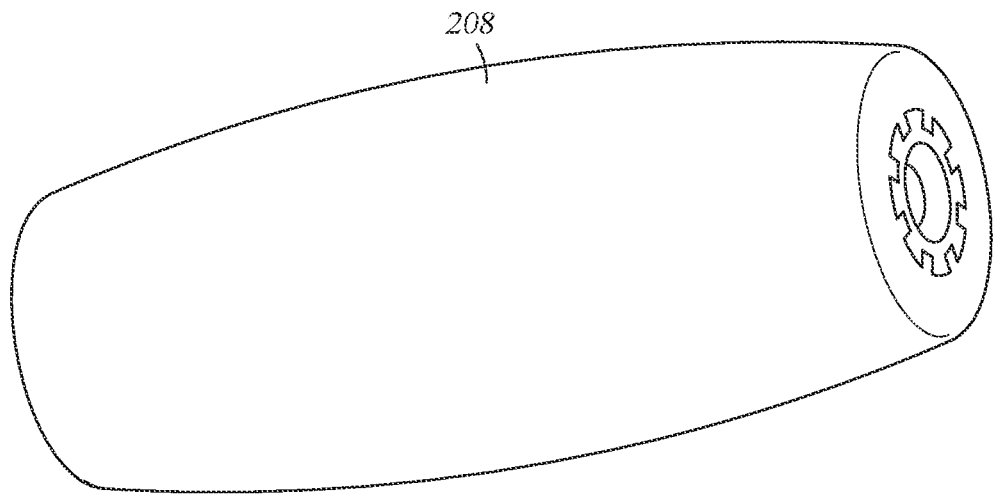
Figure 5D:
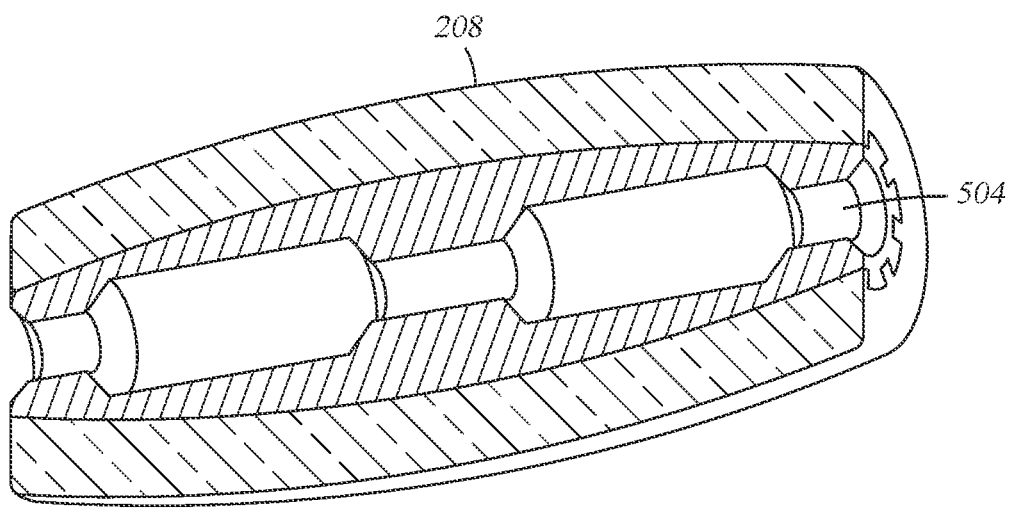

FIGS. 5C and 5D illustrate the roller 208 without the rod 502. As seen in FIGS. 5C and 5D, the roller 208 includes a central cavity 504 through which the rod 502 extends. The central cavity 504 also allows the roller 208 to rotate on the rod 502. In some embodiments, the cavity 504 includes bearings that help the rod 502 rotate within the cavity 504. The roller 208 may be made using any process. For example, the roller 208 may be made using a molding process. As another example, the roller 208 may be made using a three-dimensional printing process.

Figure 5E:
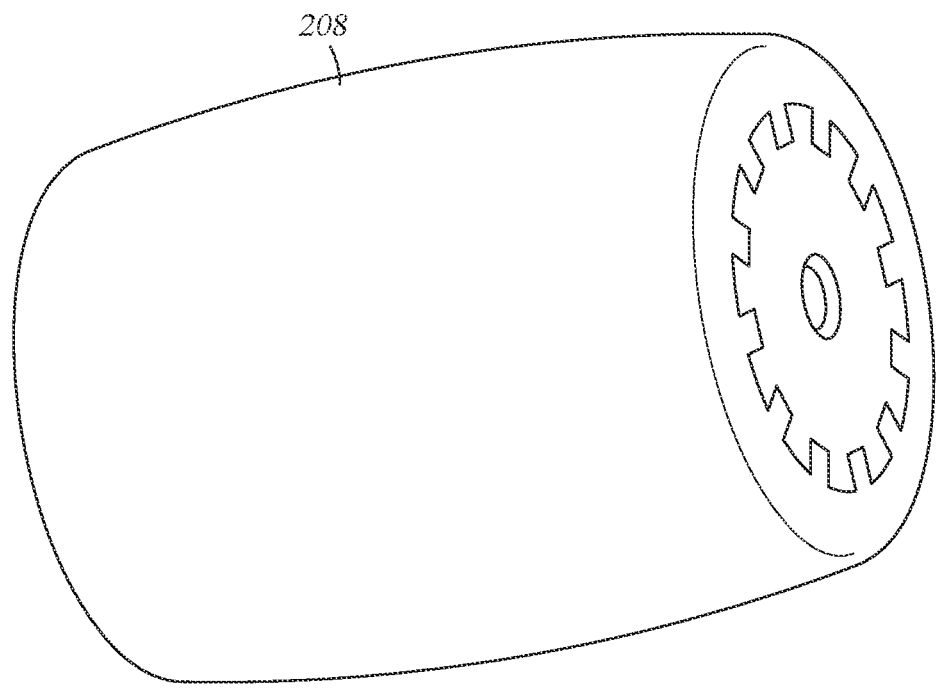
FIGS. 5E and 5F illustrate an example roller in the carrier structure of FIG. 4B.
Figure 5F:
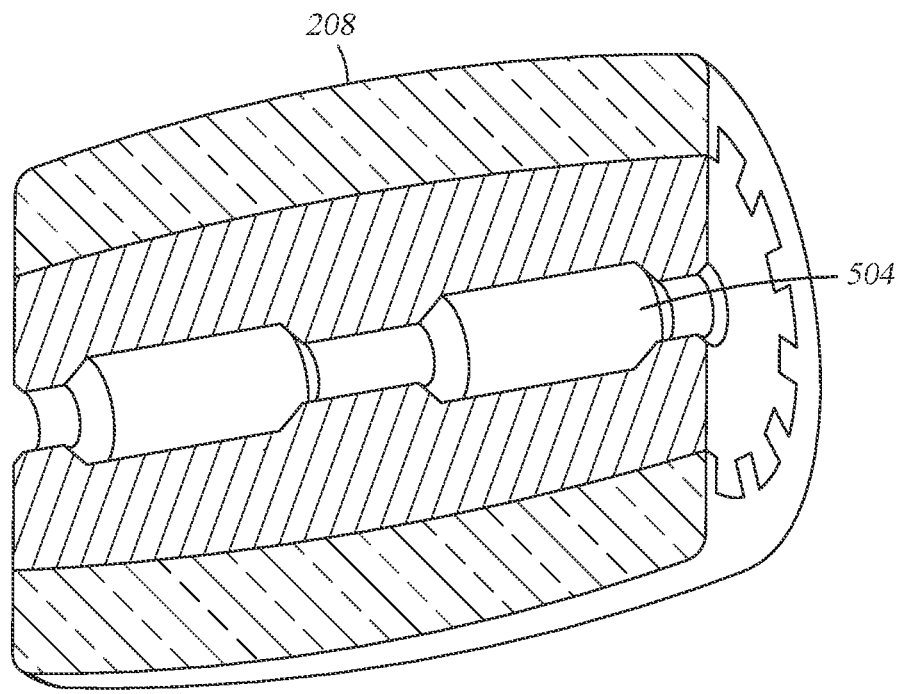

FIGS. 5E and 5F illustrate an example roller 208 in the carrier structure 206 of FIG. 4B. As seen in FIGS. 5E and 5F, the roller 208 is wider than the roller 208 in the examples of FIGS. 5A through 5D. The roller 208 includes a central cavity 504 through which the rod 502 extends. The roller 208 rotates on the rod 502. In some embodiments, the cavity 504 includes bearings that help the rod 502 rotate within the cavity 504. The roller 208 may be made using any process. For example, the roller 208 may be made using a molding process. As another example, the roller 208 may be made using a three-dimensional printing process.

Figure 5G:
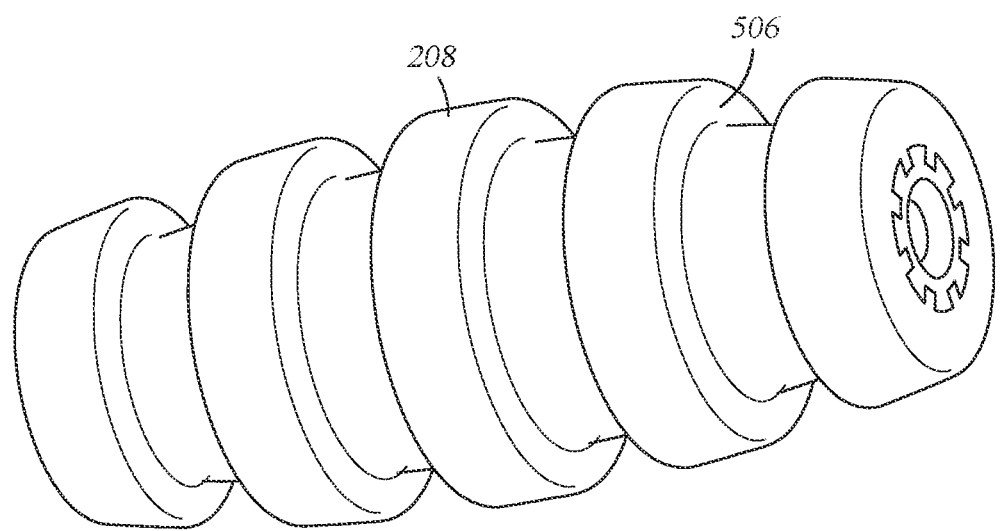
FIGS. 5G, 5H, and 5I illustrate example rollers in the carrier structures of FIGS. 4A and 4B.
Figure 5H:
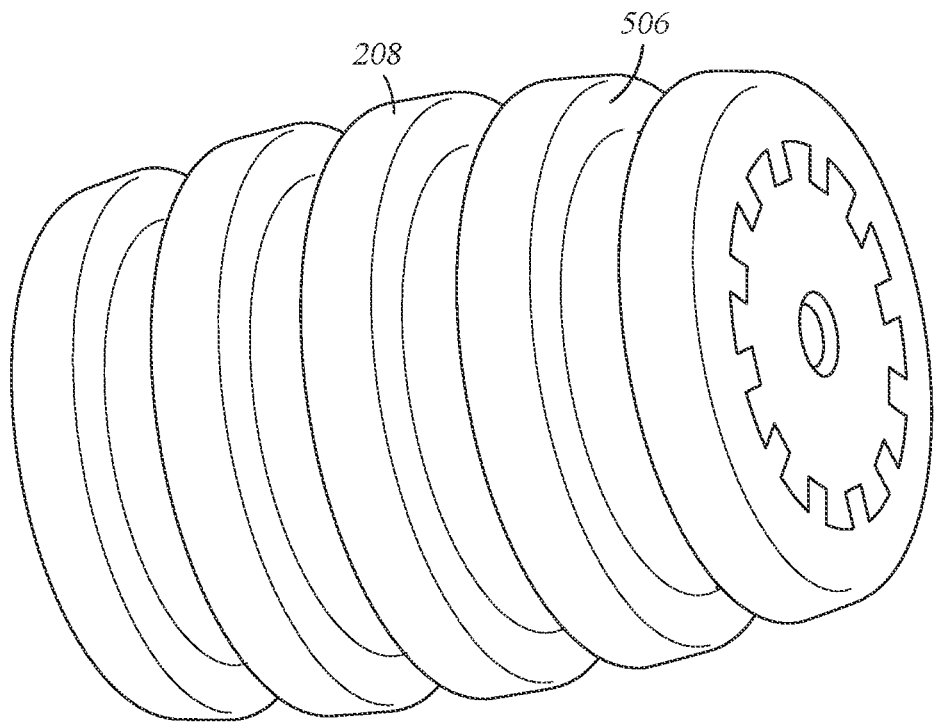
Figure 5I:
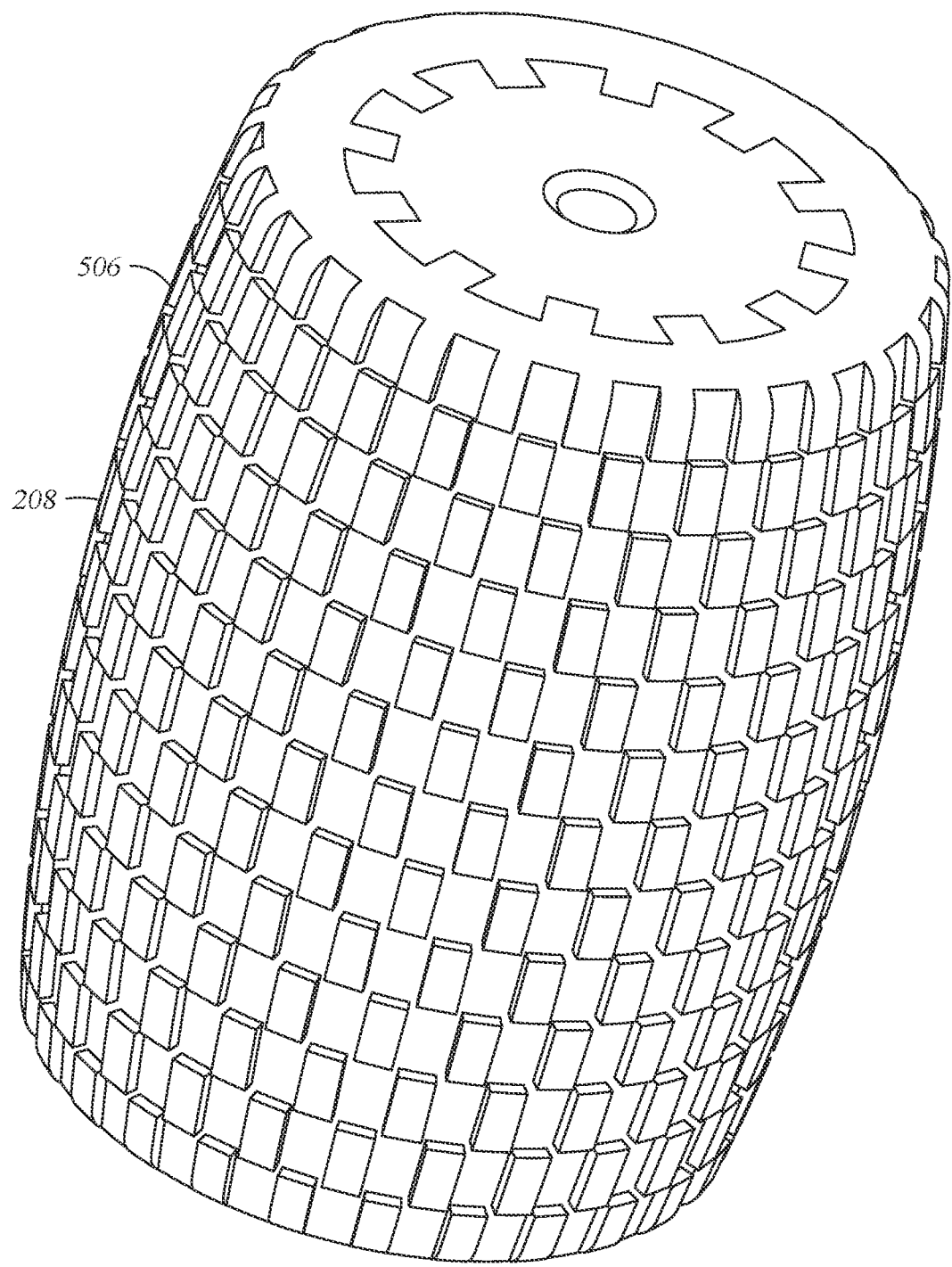

FIGS. 5G, 5H, and 5I illustrate example rollers 208 in the carrier structures 206 of FIGS. 4A and 4B. Generally, FIGS. 5G, 5H, and 5I illustrate rollers 208 with tread 506. The tread 506 includes any suitable tread pattern. In the examples of FIGS. 5G and 5H, the tread pattern includes ridges that run around a circumference of the rollers 208. Multiple ridges are arranged along the length of the roller 208. In this manner, the tread 506 is symmetric about the axis of rotation of the roller 208. In the example of FIG. 5I, the tread 506 includes bumps formed on the surface of the roller 208. In this manner, the tread 506 may be symmetric about an axis orthogonal to the axis of rotation of the roller 208. In each of these examples the tread 506 improves the grip or traction provided by the rollers 208. The tread 506 may make it more difficult for the rollers 208 to skid or slide on terrain.

Figure 6A:
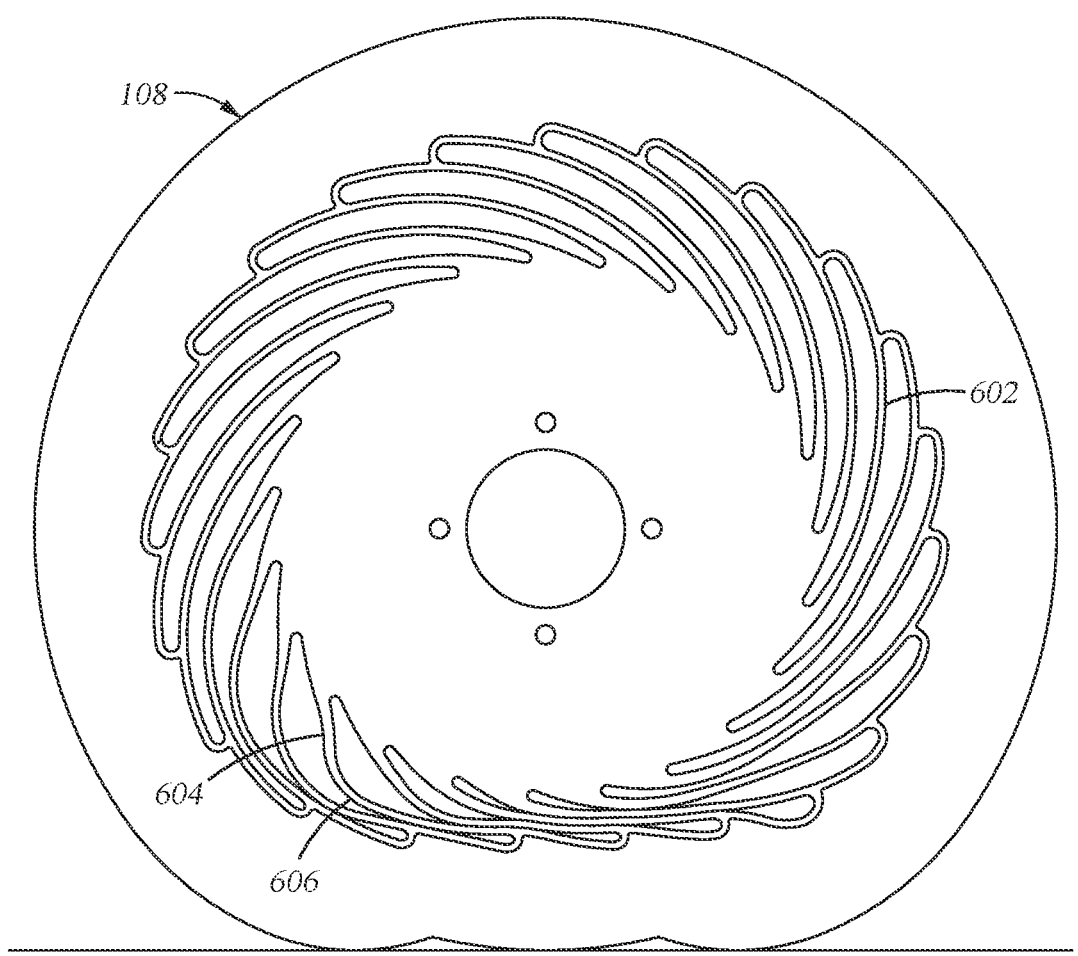
FIGS. 6A and 6B illustrate example compliant structures in the wheels of FIGS. 2A through 2F.
Figure 6B:
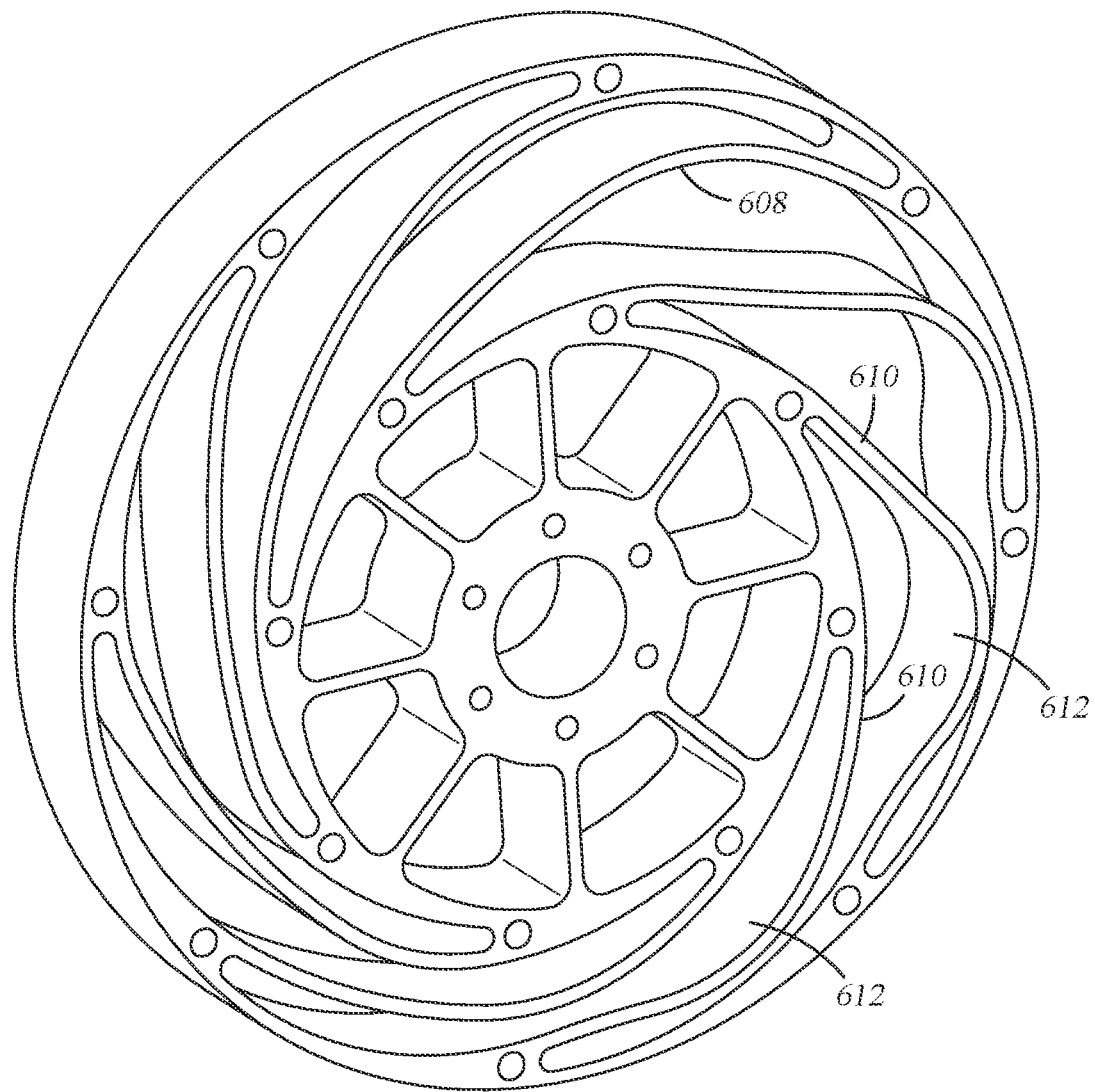

FIGS. 6A and 6B illustrate example compliant structures 602 and 608 in the wheels 108 of FIGS. 2A through 2F. Generally, FIGS. 6A and 6B illustrate how compliant structures 602 and 608 deform to absorb an impact force through elastic deformation. For example, connective elements in the compliant structures 602 and 608 may elastically buckle or bend to absorb impact forces.

As seen in FIGS. 6A, the compliant structure 602 includes connective elements 604 that spiral outwards from a hub 202 in a clockwise direction. The compliant structure 602 is experiencing an upwards impact force from the bottom of the compliant structure 602. The connective element 604 elastically deforms to absorb this impact force. For example, the compliant element 604 deforms to form a bend 606 along the length of the connective element 604. The impact force may act on the connective element 604 to cause the connective element 604 to form the bend 606. By forming the bend 606, the connective element 604 absorbs the impact force. After the impact force is absorbed, the connective element 604 returns to its original shape, which still includes a bend that is smaller in magnitude than the bend 606. The wheel 108 in the example of FIG. 6A may include a carrier structure (e.g., the carrier structure 212 shown in FIGS. 2G and 2H), which is more flexible than carrier structures 206 that hold rollers 208. As a result, the carrier structure may deform more when experiencing an impact force.

FIG. 6B illustrates a compliant structure 608 that includes connective elements 610 that spiral outwards from a hub 202 in a counterclockwise direction. The connective elements 610 may experience an upwards impact force from the bottom of the compliant structure 608. As seen in FIG. 6B, the connective elements 610 deform to form bends 612 along the length of the connective elements 610 to absorb the impact force. The impact force may act on these connective elements 610 to form the bends 612. After the connective elements 610 absorb the impact force, the connective elements 610 return to their original shapes, which still include bends that are smaller in magnitude than the bends 612.

Figure 6C:
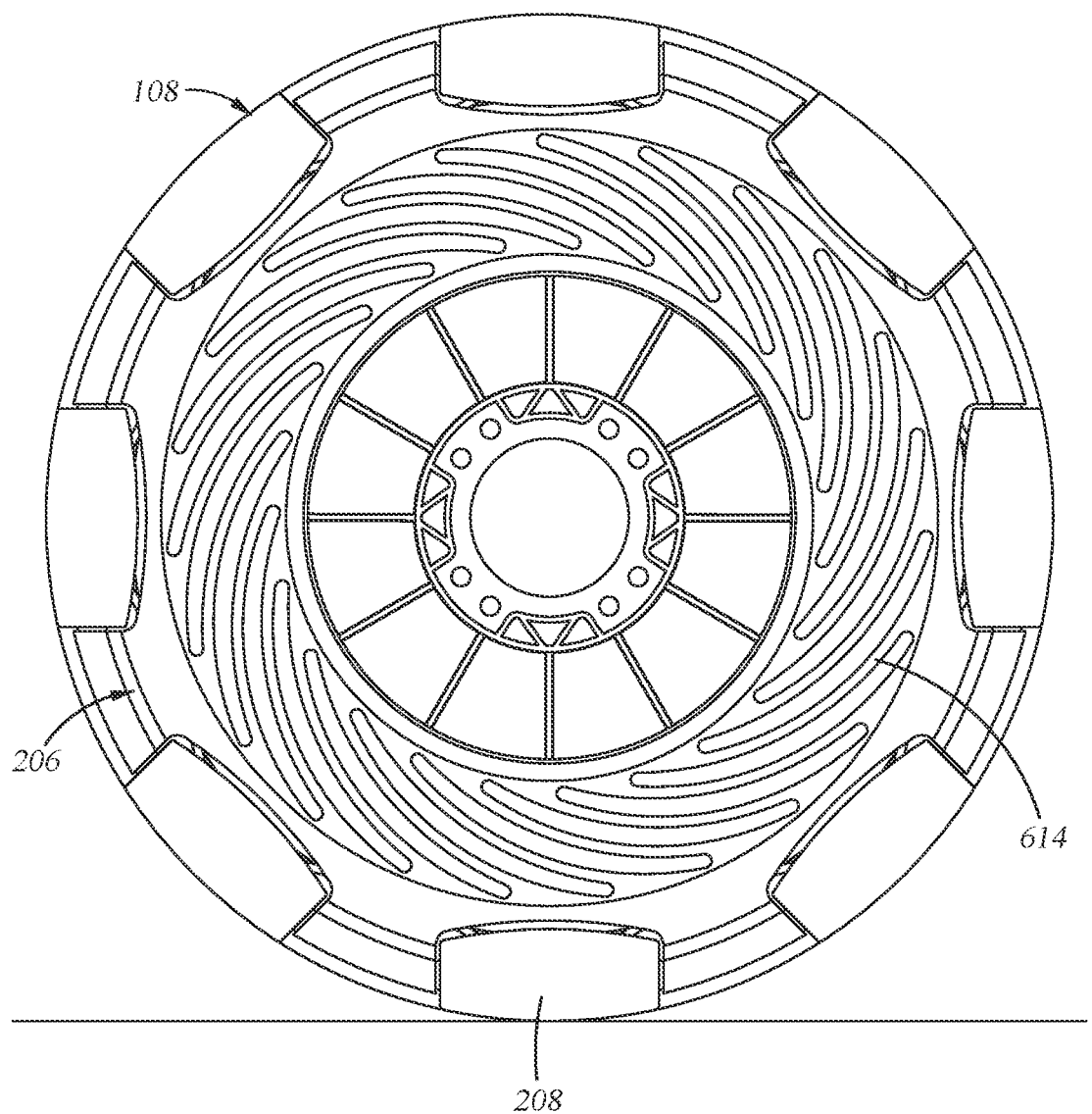
FIGS. 6C and 6D illustrate an example compliant structure in the wheels of FIGS. 2A through 2D.
Figure 6D:
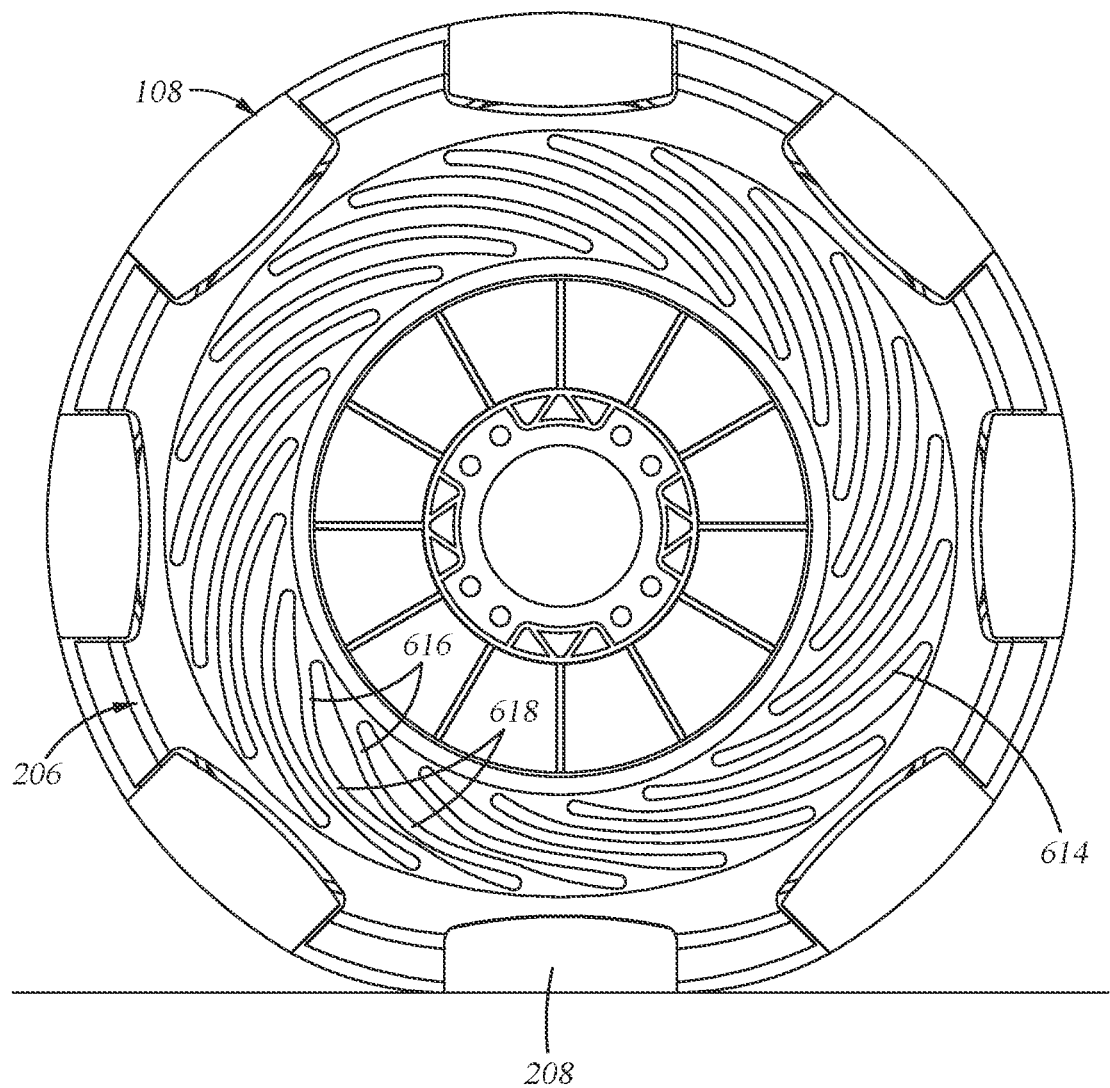

FIGS. 6C and 6D illustrate an example compliant structure 614 in the wheels 108 of FIGS. 2A through 2D. The wheel 108 includes a compliant structure 614 and a carrier structure 206 that holds rollers 208. FIG. 6C shows the wheel 108 under no load, and FIG. 6D shows the wheel 108 under a load (e.g., a 2000 Newton load). As seen in these figures, the connective elements 616 in the compliant structure 614 elastically deform under load to absorb some of the force experience by the wheel 108. Specifically, in this example, the connective elements 616 form bends 618 to absorb the load. In certain embodiments, because the compliant structure 614 absorbs some of the load experienced by the wheel 108, the roller 208 does not deform (e.g., compress) so as to prevent the roller 208 from rotating in the carrier structure 206. Although some deformation of the roller 208 or the carrier structure 206 may occur, the deformation is minimal and does not prevent the carrier structure 206 and the roller 208 from operating as desired. In an example, under load (e.g., a 2000 Newton load), the roller 208 deflects by three millimeters, which represents a 15% deflection. A rod within the roller 208 deflects by two millimeters, which represents a 10% deflection. The connective elements 616 deflect by fifteen millimeters, which represents a 75% deflection.

Figure 7:
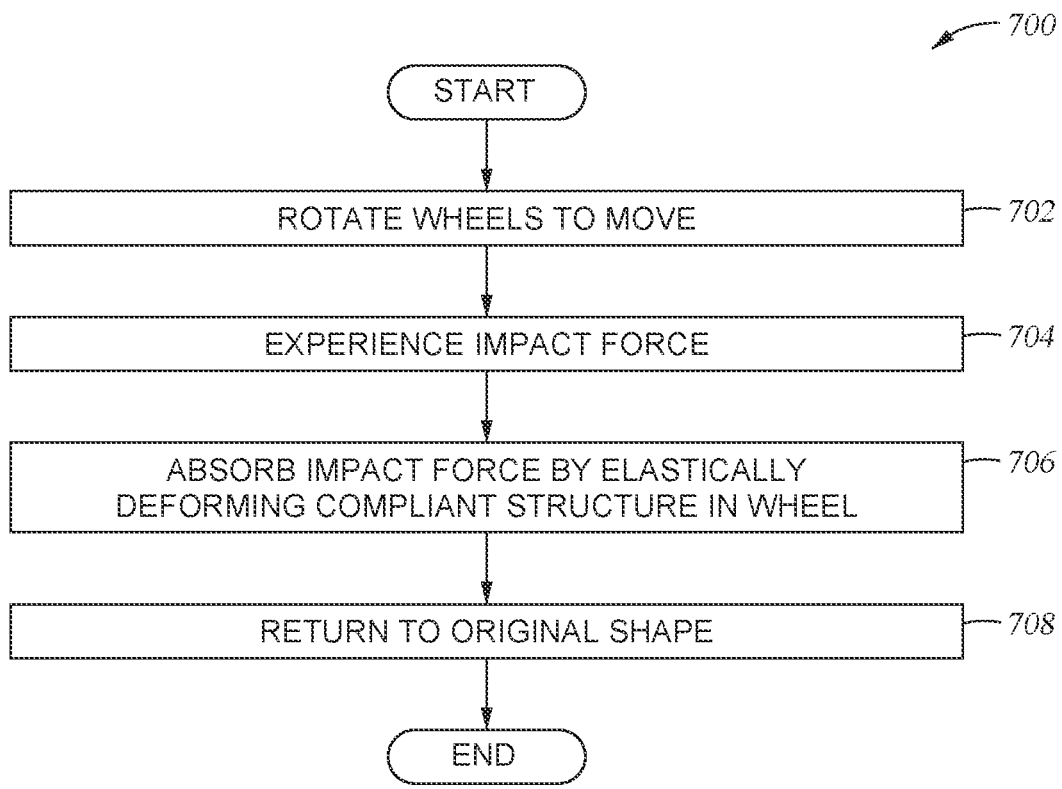
FIG. 7 is a flowchart of an example method in the system of FIG. 1.

FIG. 7 is a flowchart of an example method 700 in the system 100 of FIG. 1. The robot 102 may perform the method 700. In particular embodiments, the robot 102 absorbs impact forces using a compliant structure of a wheel 108 to protect other components of the robot 102. Additionally, the robot 102 absorbs these impact forces without a separate suspension system.

In block 702, the robot 102 rotates wheels 108 to move. The wheels 108 may be arranged on two sides of the robot 102. Rotating the wheels 108 causes the robot 102 to move forwards or backwards. By rotating the wheels 108 on one side of the robot 102 at a different speed than the wheels 108 on the other side of the robot 102, the robot 102 turns to the left or to the right. The wheels 108 include one or more rollers 208 that allow the wheels 108 to move laterally without skidding and damaging the wheels 108 when the robot 102 turns. The robot 102 uses a sensor system 106 to capture images or video of the environment around the robot 102. The robot 102 analyzes the images or video to determine how to navigate the robot (e.g., around obstacles or towards a destination). The robot 102 then rotates the wheels 108 accordingly to navigate the robot 102.

In block 704, the robot 102 experiences an impact force. For example, the robot 102 may move over rough terrain that causes the impact force. As another example, the robot may fall (e.g., off a curb), causing the impact force. The impact force may cause vibrations in the robot 102. These vibrations may damage components of the robot 102 or a package being carried by the robot 102. For example, the vibrations may damage or disrupt a sensor system 106 of the robot 102. As another example, the vibrations may damage internal circuitry of the robot 102.

In block 706, the robot 102 absorbs the impact force by elastically deforming a compliant structure 204 in the wheel 108. The compliant structure 204 includes several connective elements 306 that are formed using a material that elastically deforms when experiencing an impact force. For example, the connective elements may bend, move, compress, or stretch when experiencing an impact force. These deformations in the connective elements absorb the impact force. After the impact force is absorbed, the connective elements return to their original shapes in block 708. In this manner, the connective elements protect other components of the robot 102 from being damaged by the impact force. As a result the robot 102 absorbs impact forces without using a separate suspension system, which reduces the weight of the robot 102 in particular embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

While the foregoing is directed to embodiments of the present invention, other and further embodiments of the invention may be devised without departing from the basic scope thereof, and the scope thereof is determined by the claims that follow.

What is claimed is:

1. A mobile robot comprising:
   a body;
   a sensor disposed in the body and configured to capture an image of an environment of the mobile robot;
   one or more motors disposed in the body;
   a plurality of wheels coupled to the one or more motors, each wheel of the plurality of wheels comprising:
   a carrier structure holding a plurality of rollers, each roller of the plurality of rollers positioned about a rod, a first end of the rod coupled with the carrier structure and a second end of the rod coupled with the carrier structure, the plurality of rollers configured to rotate within the carrier structure about the rod and about an axis that is orthogonal to an axis of rotation of a respective wheel;
   a hub removably positioned within a center of the respective wheel; and
   a compliant structure comprising a first plurality of connective elements, the first plurality of connective elements extending from an inner circumference of the compliant structure to an outer circumference of the compliant structure, the compliant structure configured to be removably positioned within a rim of the carrier structure, the rim of the carrier structure comprising a plurality of grooves or teeth configured to fit around a plurality of contours of the outer circumference of the compliant structure, wherein the first plurality of connective elements absorbs a force experienced by the carrier structure by elastically deforming towards the hub with minimal deformation in the carrier structure; and
   a hardware processor configured to control the one or more motors to rotate the plurality of wheels based on the image of the environment to move the mobile robot.

2. The mobile robot of claim 1, wherein each wheel of the plurality of wheels further comprises a second plurality of connective elements coupled to the hub and the carrier structure.

3. The mobile robot of claim 1, wherein the carrier structure is a first carrier structure and further comprising a second carrier structure comprising a second plurality of rollers, wherein the first carrier structure and the second carrier structure are positioned around the outer circumference of the compliant structure, and wherein the first carrier structure is positioned adjacent to the second carrier structure.

4. The mobile robot of claim 1, wherein each roller of the plurality of rollers comprises tread.

5. An apparatus comprising:
   a hub;
   a carrier structure surrounding the hub, the carrier structure holding a first plurality of rollers, each roller of the first plurality of rollers positioned about a rod, a first end of the rod coupled with the carrier structure and a second end of the rod coupled with the carrier structure, the first plurality of rollers configured to rotate within the carrier structure about the rod and about an axis that is orthogonal to an axis of rotation of the hub; and
   a compliant structure comprising a first plurality of connective elements extending from an inner circumference of the compliant structure to an outer circumference of the compliant structure, the compliant structure configured to be removably positioned within a rim of the carrier structure, the rim of the carrier structure comprising a plurality of grooves or teeth configured to fit around a plurality of contours of the outer circumference of the compliant structure, wherein a connective element of the first plurality of connective elements is configured to elastically deform to absorb a force experienced by the carrier structure such that the first plurality of rollers can rotate within the carrier structure while the carrier structure experiences the force.

6. The apparatus of claim 5, wherein the first plurality of connective elements spirals outwards from the hub towards the carrier structure.

7. The apparatus of claim 6, further comprising a second compliant structure comprising a second plurality of connective elements, wherein the second plurality of connective elements spirals outwards from the hub towards the carrier structure in a direction opposite the first plurality of connective elements.

8. The apparatus of claim 7, wherein the second plurality of connective elements is configured to elastically deform to absorb the force.

9. The apparatus of claim 7, wherein the second plurality of connective elements is positioned along an opposite side of the hub than the first plurality of connective elements.

10. The apparatus of claim 5, wherein thicknesses of the first plurality of connective elements taper from the carrier structure to the hub.

11. The apparatus of claim 5, wherein each connective element of the first plurality of connective elements has a consistent thickness over a majority of its length.

12. The apparatus of claim 5, wherein the first plurality of connective elements are linear.

13. The apparatus of claim 5, wherein the carrier structure is a first carrier structure and further comprising a second carrier structure comprising a second plurality of rollers, wherein the first carrier structure and the second carrier structure are positioned around the outer circumference of the compliant structure, and wherein the first carrier structure is positioned adjacent to the second carrier structure.

14. The apparatus of claim 13, wherein the first plurality of rollers is positioned around the first carrier structure alternately with respect to the second plurality of rollers around the second carrier structure.

15. The apparatus of claim 5, wherein each roller of the first plurality of rollers comprises tread.

16. The apparatus of claim 5, wherein the first plurality of connective elements is more compliant than the hub and the carrier structure.

17. The apparatus of claim 5, wherein each connective element of the first plurality of connective elements comprises a first portion coupled to the inner circumference of the compliant structure, a second portion coupled to the first portion, and a third portion coupled to the second portion and the outer circumference of the compliant structure, wherein the first portion extends from the hub in a first direction towards the carrier structure, the second portion extends from the first portion in a second direction different from the first direction, and the third portion extends from the second portion in a third direction different from the first and second directions.

18. The apparatus of claim 17, wherein a first connective element of the first plurality of connective elements overlaps with a second connective element of the first plurality of connective elements.

19. An apparatus comprising:
a hub;
a carrier structure surrounding the hub, the carrier structure holding a plurality of rollers, each roller of the plurality of rollers positioned about a rod, a first end of the rod coupled with the carrier structure and a second end of the rod coupled with the carrier structure, the plurality of rollers configured to rotate within the carrier structure about the rod and about an axis that is orthogonal to an axis of rotation of the hub; and
a compliant structure comprising a first plurality of connective elements extending from an inner circumference of the compliant structure to an outer circumference of the compliant structure, the compliant structure configured to be removably positioned within a rim of the carrier structure, the rim of the carrier structure comprising a plurality of grooves or teeth configured to fit around a plurality of contours of the outer circumference of the compliant structure, wherein the first plurality of connective elements spirals outwards from the hub towards the carrier structure, wherein a connective element of the first plurality of connective elements is configured to elastically bend towards the hub to absorb a force experienced by the carrier structure such that the plurality of rollers can rotate within the carrier structure while the carrier structure experiences the force.

20. The apparatus of claim 19, further comprising a second compliant structure comprising a second plurality of connective elements, wherein the second plurality of connective elements spirals outwards from the hub towards the carrier structure in a direction opposite the first plurality of connective elements.

* * * * *